US008050515B2

(12) United States Patent
Chen

(10) Patent No.: US 8,050,515 B2
(45) Date of Patent: Nov. 1, 2011

(54) IMAGE PROCESSING CIRCUIT AND METHOD THEREOF FOR ENHANCING TEXT DISPLAYING

(75) Inventor: Hsing-Chuan Chen, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 799 days.

(21) Appl. No.: 12/144,663

(22) Filed: Jun. 24, 2008

(65) Prior Publication Data

US 2009/0257678 A1 Oct. 15, 2009

(30) Foreign Application Priority Data

Apr. 11, 2008 (TW) .............................. 97113249 A

(51) Int. Cl.
*G06K 9/40* (2006.01)

(52) U.S. Cl. ....................................... 382/274; 382/254

(58) Field of Classification Search .................. 382/173, 382/176, 274–275, 254, 190; 358/1.9, 2.1, 358/3.26–3.27; 345/589; 702/107; 348/468
See application file for complete search history.

(56) References Cited

U.S. PATENT DOCUMENTS

| | | | | |
|---|---|---|---|---|
| 5,946,420 | A * | 8/1999 | Noh | 382/254 |
| 6,532,041 | B1 * | 3/2003 | Monta et al. | 348/468 |
| 7,328,116 | B2 * | 2/2008 | Bala et al. | 702/107 |
| 7,418,138 | B2 * | 8/2008 | Ahmed | 382/190 |
| 7,668,394 | B2 * | 2/2010 | Ahmed | 382/274 |
| 7,894,686 | B2 * | 2/2011 | Jang | 382/274 |
| 2005/0206633 | A1 * | 9/2005 | Mukai | 345/204 |
| 2006/0017743 | A1 * | 1/2006 | Chan et al. | 345/589 |

* cited by examiner

*Primary Examiner* — Ishrat I Sherali
(74) *Attorney, Agent, or Firm* — Jianq Chyun IP Office

(57) ABSTRACT

An image processing circuit and method thereof for enhancing text displaying of an image are provided. The image processing circuit performs the method. Firstly, at least a first illumination area and at least a second illumination, which is located adjacent to the first illumination area in the image are defined according to luminance values of a plurality of pixels of the image. Next, a luminance regulation value of at least one of the pixels in the first illumination area is calculated, and the luminance value of the corresponding pixel in the first illumination area is adjusted according to the luminance regulation value. During processing of the image, the luminance values of all of the pixels in the second illumination area are restricted from any adjustment.

20 Claims, 15 Drawing Sheets

| S' | α | β |
|---|---|---|
| 0 | 1 | 1/128 |
| 1 | 1/2 | 1/64 |
| 2 | 1/4 | 1/32 |
| 3 | 1/8 | 1/16 |
| 4 | 1/16 | 1/8 |
| 5 | 1/32 | 1/4 |
| 6 | 1/64 | 1/2 |
| 7 | 0 | 2 |

IMAGE PROCESSING CIRCUIT AND METHOD THEREOF FOR ENHANCING TEXT DISPLAYING

CROSS-REFERENCE TO RELATED APPLICATION

This application claims the priority benefit of Taiwan application serial no. 97113249, filed on Apr. 11, 2008. The entirety of the above-mentioned patent application is hereby incorporated by reference herein and made a part of this specification.

BACKGROUND OF THE INVENTION

1. Field of the Invention

The present invention relates to an image processing circuit and a method thereof. More particularly, the present invention relates to an image processing circuit and a method thereof for enhancing text displaying.

2. Description of Related Art

With growing popularity of the Internet, some network service providers cooperate with publishers or libraries to digitalize books originally published in printings. Then, image data of the digitalized books are provided to Internet users for downloading in a paid or a free approach. Moreover, with fast growing of global population, and considering limited utilization spaces, to effectively utilize spaces, some enterprises or families also try to digitalize printed data via digital cameras or scanners. However, massively digitalisation of texts results in a fact that some texts recorded by digital images are blurry and hard to be read, and therefore it is inconvenient for the users to read such images shown on a display.

Conventional enhancement of read comfort for a digital display is to adjust a color temperature thereof, though there is no special processing method for the texts. Such processing method has no actual improvement for documents with low contrast, especially for scanned documents. Since text information in an image belongs to a high-frequency signal, if the text information is to be enhanced, a sharpening process is generally applied. Though such processing method is the most directive, it still cannot improve the read comfort.

FIG. 1 is a diagram illustrating a relation between luminance values of a plurality of pixels $P_1$ to $P_{18}$ of a display, and corresponding luminance regulation values thereof. In FIG. 1, the pixels $P_1$ to $P_{18}$ are arranged in a row, and the horizontal axis represents relative positions of the pixels $P_1$ to $P_{18}$ on the display. The left vertical axis represents the luminance values of the pixels, and the right vertical axis represents the luminance regulation values of the pixels. To avoid confusion, the luminance value of each pixel is represented by a bold solid line 10, and the corresponding luminance regulation value of each pixel is represented by a non-bold solid line 12. In the present embodiment, the luminance value of each pixel is within a range of 0 to 255, and the brighter the pixel is, the greater the luminance value thereof is; conversely, the darker the pixel is, the smaller the luminance value thereof is. The luminance regulation values of the pixels may be positive, negative or zero, and if the luminance regulation value is positive, it represents the luminance value of the corresponding pixel is enhanced, so that the pixel becomes brighter; if the luminance regulation value is negative, it represents the luminance value of the corresponding pixel is decreased such that the pixel becomes darker; and if the luminance regulation value is zero, it represents that no adjustment is performed to the luminance value of the pixel. For simplicity's sake, the luminance value and the luminance regulation value of the pixel are represented by the same unit in FIG. 1, and a coordinate of the luminance regulation value 0 on the right vertical axis is corresponding to a coordinate of the luminance value 127 on the left vertical axis. Each of the pixels is grouped into a bright portion or a dark portion according to the luminance values thereof, wherein all of the luminance values of the pixels in a bright portion are greater than or equal to 127, and all of the luminance values of the pixels in a dark portion are less than 127. For example, the pixels $P_1$ to $P_5$ and the pixels $P_{13}$ to $P_{18}$ are respectively in two different bright portions, and the pixels $P_6$ to $P_{12}$ are in the dark portion between the two bright portions.

In case that a background portion of an image is brighter than a text portion of the image (for example, an image with white background and black texts), the bright portion corresponds to the background portion of the image, and the dark portion corresponds to the text portion of the image. Due to a characteristic of texts, a simplex sharpness filter may impose a high pass enhancement respectively to the bright portion and the dark portion. As shown in FIG. 1, luminance values of the pixels $P_5$ and $P_{13}$ in the bright portion and located adjacent to the dark portion may be enhanced (i.e. the luminance regulation values thereof are positive), and luminance values of the pixels $P_6$ and $P_{12}$ in the dark portion and located adjacent to the bright portion may be decreased (i.e. the luminance regulation values thereof are negative). However, in case of the white background and black texts, enhancement of the bright portion leads to an adverse effect of ringing to the text portion, so that the texts may be looked more uncomfortable. Moreover, if settings of the luminance regulation values are not suitable, an over-shoot or an under-shoot phenomenon may be occurred. In addition, noise interference of an analog-to-digital converter (ADC) also causes an abnormity of the image, and accordingly the user may have an uncomfortable feeling when observing the image.

Moreover, a conventional method for enhancing text displaying is to perform separate treatment to the text portion or non-text portion (such as figures or pictures, etc.) based on a setting of a threshold value. However, in a system with relatively great noise at an input terminal thereof, such method may leads to a situation that identical graphic information displays differently in different frame periods due to an interference of the noise. Therefore, the display quality is lower.

SUMMARY OF THE INVENTION

The present invention is directed to a self-adaptive image processing circuit and a method thereof, by which each pixel is imparted with a corresponding luminance enhancement value by analysing corresponding luminance information and chrominance information thereof, so as to effectively reduce unstable disturbance phenomenon of an image and stabilize an output result of the image.

The present invention is directed to an image processing circuit and a method thereof, by which whether a pixel belongs to a text portion, to a picture portion or to a background portion is determined according to luminance and chrominance information thereof, so as to enhance luminance values of the pixels in the text portion for enhancing text displaying.

The present invention is directed to an image processing circuit and a method thereof, by which text displaying is enhanced based on one-dimensional image processing, so that excessive hardware cost required by two-dimensional image process is avoided, and complicated optical character recognition (OCR) operations are avoided, and accordingly operation procedure is simplified.

The present invention provides an image processing circuit and a method thereof for enhancing text displaying of an image. The method is as follows. Firstly, at least a first illumination area and at least a second illumination area, which is located adjacent to the first illumination area, in the image are defined according to luminance values of a plurality of pixels of the image. Next, a luminance regulation value of at least one of the pixels in the first illumination area is calculated, and the luminance value of the corresponding pixel in the first illumination area is adjusted according to the luminance regulation value. During processing of the luminance values of the pixels of the image, all of the luminance values of the pixels in the second illumination area are restricted from any adjustment.

In an embodiment of the present invention, the first illumination area is a bright portion of the image, and the second illumination area is a dark portion of the image.

In an embodiment of the present invention, the first illumination area is the dark portion of the image and the second illumination area is the bright portion of the image.

In an embodiment of the present invention, the first illumination area and the second illumination area are defined according to a predetermined threshold value.

In an embodiment of the present invention, a luminance reference value of each of the pixels in the image is further calculated, wherein the luminance reference value of each pixel is calculated according to the luminance value of the pixel and the luminance values of the plurality of pixels located adjacent to the pixel, and the first illumination area and the second illumination area are defined according to the luminance reference value of each pixel.

In an embodiment of the present invention, the luminance reference value is equal to $(Bt-N_1 \times Bp)$, wherein Bt is a summation of $N_1$ luminance values of the pixels located adjacent to the pixel, Bp is the luminance value of the pixel, and $N_1$ is a positive integer.

In an embodiment of the present invention, step of calculating the luminance regulation value of at least one of the pixels includes calculating a factor pair of each pixel according to the luminance reference value of each pixel, wherein each factor pair has a main factor and a sub factor that are not all non-zero, and for each pixel having the luminance regulation value, the luminance regulation value thereof is calculated based on the factor pair of the pixel and the factor pairs of the pixels located adjacent to the pixel.

In an embodiment of the present invention, an enhancement value of the pixel is further calculated according to the main factor and the sub factor thereof, and the luminance regulation value relates to the enhancement value.

In an embodiment of the present invention, chrominance difference reference values of a plurality of blocks in the image are further calculated according to chrominances of the pixels. Next, the enhancement values of the pixels are adjusted according to the chrominance difference reference values, and then the luminance regulation values are modified according to the adjusted enhancement values.

In an embodiment of the present invention, each of the blocks has a plurality of the adjacent pixels, and the chrominance difference reference value of each block is calculated according to the chrominances of all the pixels within the block and a chrominance reference value.

In an embodiment of the present invention, it is determined whether there is any picture area in the image according to the chrominances of the plurality of pixels. If the image has any picture area, it is further determined whether the first illumination area is overlapped with any picture areas. If the first illumination area is overlapped with any picture areas, all of the luminance values of the pixels in an overlapped area of the first illumination area and the picture area are restricted from any adjustment.

In an embodiment of the present invention, steps of determining whether there is any picture area in the image include calculating the chrominance difference reference values of a plurality of the blocks in the image, and determining whether the chrominance difference reference value of each block is greater than a difference threshold value. Wherein, each block has a plurality of the adjacent pixels, and the chrominance difference reference value of each block is calculated according to the chrominances of all the pixels in the block and a chrominance reference value. If the chrominance difference reference value of the block is greater than the difference threshold value, it is determined that the block is within a picture area.

In an embodiment of the present invention, the chrominance of the pixel is represented by a first chrominance value Cb and a second chrominance value Cr.

In an embodiment of the present invention, the chrominance reference value is selected from a plurality of chrominance setting values.

The present invention provides an image processing circuit for enhancing text displaying. The image processing circuit includes a luminance calculating circuit, a main factor calculating circuit, a sub factor calculating circuit and a delayer. The luminance calculating circuit is used for calculating and outputting a luminance reference value of a target pixel according to a luminance value of the pixel and luminance values of a plurality of pixels located adjacent to the pixel. The main factor calculating circuit is coupled to an output terminal of the luminance calculating circuit, and is used for outputting a main factor according to the luminance reference value. The sub factor calculating circuit is coupled to the output terminal of the luminance calculating circuit, and is used for outputting a sub factor according to the luminance reference value. The delayer is coupled to the main factor calculating circuit, and is used for delaying an output of the main factor calculating circuit to output a main factor of a previous pixel of the target pixel. The image processing circuit adjusts the luminance value of the target pixel according to the main factor, the sub factor and the main factor of the previous pixel.

In an embodiment of the present invention, the image processing circuit further includes a chrominance calculating circuit for determining whether the target pixel belongs to a picture area according to chrominance information of the target pixel, and determining a voltage level of a control signal. The image processing circuit further determines whether to adjust the luminance value of the target pixel according to the control signal.

In an embodiment of the present invention, the image processing circuit further includes a chrominance calculating circuit for calculating a chrominance difference reference value according to the chrominance information of the target pixel and the chrominance information of the pixels located adjacent to the target pixel. The image processing circuit further adjusts the luminance value of the target pixel according to the chrominance difference reference value.

In order to make the aforementioned and other objects, features and advantages of the present invention comprehensible, preferred embodiments accompanied with figures is described in detail below.

DESCRIPTION OF EMBODIMENTS

Figure 1:
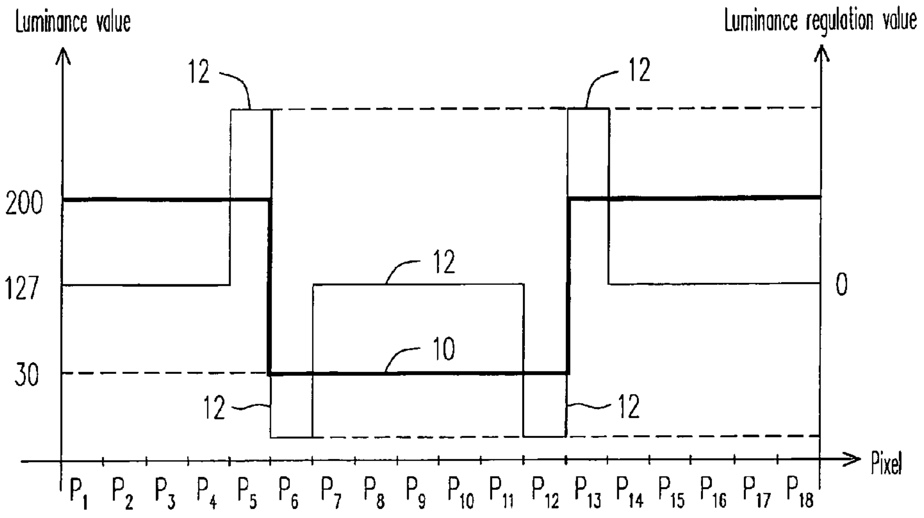
FIG. 1 (PRIOR ART)
FIG. 1 is a diagram illustrating a conventional relation between luminance values and luminance regulation values of pixels.
Figure 2:
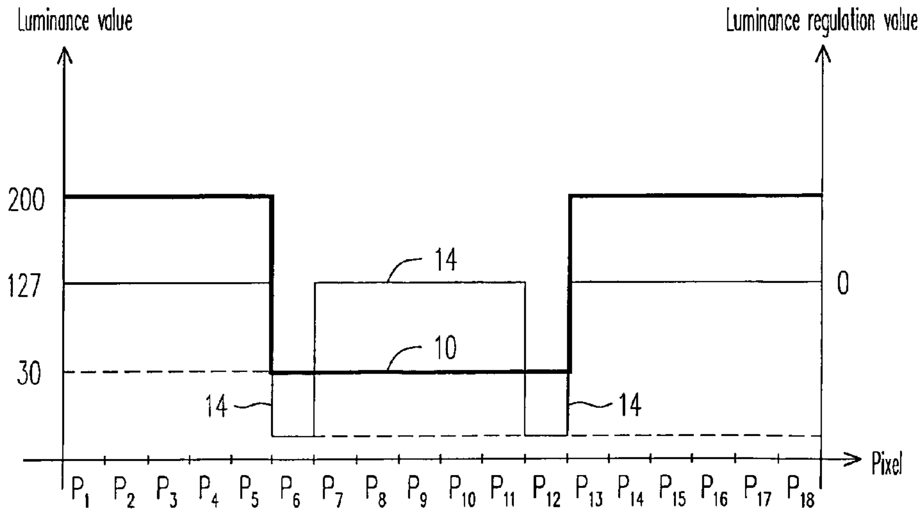
FIG. 2 is a diagram illustrating a relation between luminance values and luminance regulation values of pixels according to a preferred embodiment of the present invention.

Referring to FIG. 2, FIG. 2 is a diagram illustrating luminance values of a pixel row formed by a plurality of pixels of a display, and luminance regulation values set based on the present invention. FIG. 2 is similar to FIG. 1, the horizontal axis thereof represents relative positions of pixels $P_1$ to $P_{18}$ on the display, the left vertical axis represents luminance values of pixels, and the right vertical axis represents luminance regulation values of the pixels. The pixels $P_1$ to $P_{18}$ are included within a pixel array including m rows and n columns of pixels, and the pixels $P_1$ to $P_{18}$, which are taken as an example, are selected from one of the rows of pixel in the pixel array.

Similar to FIG. 1, the luminance values of the pixels in FIG. 2 are also represented by a bold solid line 10, and the luminance regulation values, which are set based on the present invention, corresponding to each of the pixels are represented by a non-bold solid line 14. In the present embodiment, each of the luminance values of the pixels has a data length of 8-bits, and therefore each of the luminance values is within a range of 0 to 255, wherein the brighter the pixel is, the greater the luminance value thereof is; conversely, the darker the pixel is, the smaller the luminance value thereof is. It should be noted that in the present invention, data length of the luminance value of each pixel is not necessarily to be 8 bits, and the luminance value having other data lengths may also be adapted.

Moreover, the regulation value of the pixel may be positive, negative or zero. When the luminance regulation value is positive, it represents the luminance value of the corresponding pixel is enhanced, so that the pixel becomes brighter; when the luminance regulation value is negative, it represents the luminance value of the corresponding pixel is decreased, so that the pixel becomes darker; and when the regulation value is zero, it represents there is no adjustment for the luminance value of the pixel. However, different from the conventional technique, in the present invention, only the luminance values of the pixels of a bright portion or the dark portion are adjusted, and it is restricted from simultaneous adjustment of the pixels of both the bright portion and the dark portion in a single image. Further, in the same image, the luminance regulation values of different pixels cannot be simultaneously positive and negative. In other words, if any of the luminance regulation values of the pixels is greater than zero, the other regulation values of the pixels cannot be less than zero; similarly, if any of the luminance regulation values of the pixels is less than zero, the other luminance regulation values of the pixels cannot be greater than zero. As shown in FIG. 2, in the present embodiment, all of the luminance values of the pixels in the bright portion are restricted from any adjustment, and therefore the luminance regulation values in the bright portion are all zero. Moreover, only the luminance regulation values of the pixels in the dark portion are not zero, and therefore only the luminance values of the pixels in the dark portion would be adjusted.

Figure 3:
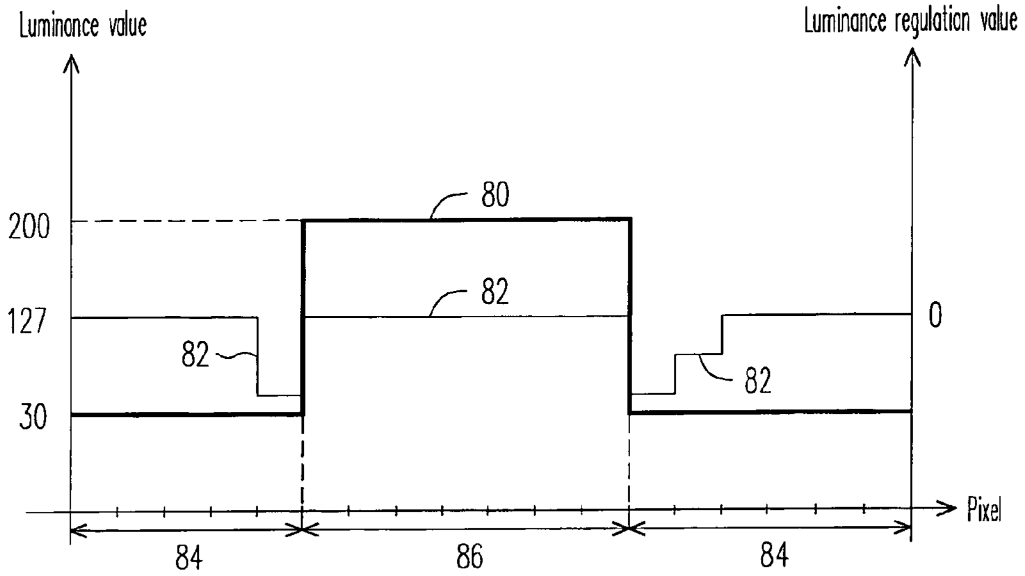
FIG. 3 is a diagram illustrating a relation between luminance values and luminance regulation values of pixels according to another preferred embodiment of the present invention.

Compared to the above embodiment that only the luminance values of the pixels in the dark portion of the image are adjusted, in another embodiment of the present invention, only the luminance values of the pixels in the bright portion of the image are adjusted, and the luminance values of the pixels in the dark portion are not adjusted. For example, for an image with black background and white texts, in order to highlight the texts, the luminance values of the pixels corresponding to the texts are enhanced, though luminance values of the pixels corresponding to the black background are maintained. However, in another embodiment of the present invention, regarding the image with the background being darker than the texts, text displaying may also be enhanced by adjusting the luminance of the background and maintaining the luminance of the text portion. Referring to FIG. 3, two background portions 84 and a text portion 86 are illustrated, wherein the bold solid lines 80 represent the luminance values of the pixels, and the non-bold solid lines 82 represent luminance regulation values of the pixels. As shown in FIG. 3, it is obvious that the luminance values of the pixels of the background portions 84 are less than that of the text portion 86, during enhancing of the text displaying, the luminance values of the pixels of the background portions 84 are decreased, while the luminance values of the pixels of the text portion 86 are remained unchanged. Therefore, contrast of the text portion 86 relative to the background portions 84 are strengthened, so that displaying of the text portion 86 is relatively enhanced.

In another embodiment of the present invention, the bright portions and the dark portions of the image are defined with reference of a predetermined threshold value. When the luminance value of the pixel is greater than or equal to the predetermined threshold value, the pixel then belongs to a bright portion; and when the luminance value of the pixel is less than the predetermined threshold value, the pixel then belongs to a dark portion. Such method is the same to the prior art that the luminance value 127 is taken as the predetermined value for defining the bright portions and the dark portions. Referring to FIG. 2, the pixels $P_1$ to $P_5$ and $P_{13}$ to $P_{18}$ are respectively in two different bright portions, and the pixels $P_6$ to $P_{12}$ are in the dark portion located between the above two bright portions. It should be noted that, in FIG. 2, only a part of the pixels of the image are selected for description, and therefore persons skilled in the art would understand that the method for defining the bright portions and the dark portions of the present invention may be applied to all of the pixels in the whole image. On the other hand, the luminance value used for defining the bright portions and the dark portions is not limited to be 127, and persons skilled in the art would understand that the luminance value used for defining the bright portions and the dark portions could be other values to fit various actual utilization requirements.

Moreover, since the bright portions and the dark portions are defined based on the predetermined threshold value, each of the pixels in the image should belong to either a bright portion or a dark portion, and cannot simultaneously belong to both a bright portion and a dark portion. In addition, deduced by analogy, if an image simultaneously has at least one bright portion and at least one dark portion, the bright portion must be located adjacent to the dark portion. Certainly, the above method for defining the bright portions and the dark portions according to the predetermined threshold value may lead to a situation that an image may only has one bright portion and have no dark portion, or only has one dark portion and has no bright portion. In such case, it may be regarded that there is no text in the image, and enhancing for text displaying is unnecessary.

Figure 4:
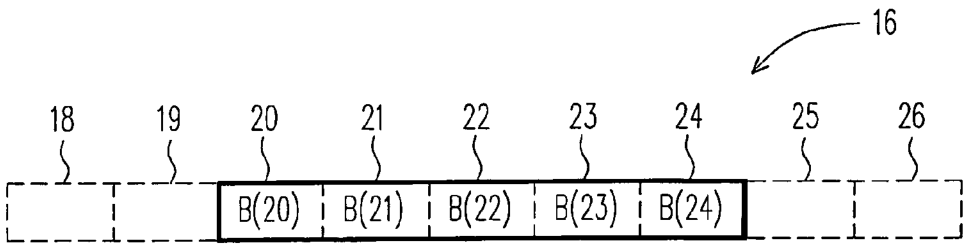
FIG. 4 is a diagram auxiliary to calculation of a luminance reference value according to a preferred embodiment of the present invention.

In another embodiment of the present invention, at least one bright portion and at least one dark portion located adjacent to the bright portion may also be defined in an image, and whether a pixel belongs to the bright portion or the dark portion is determined based on the luminance value of the pixel and the luminance values of the plurality of pixels located adjacent to the pixel. Referring to FIG. 4, which is a diagram illustrating the method of determining whether the pixel belongs to the bright portion or the dark portion according to the luminance value of the pixel and the luminance values of the plurality of pixels located adjacent to the pixel. In FIG. 4, a part of the pixels 18 to 26 of a row 16 in the image are illustrated, wherein the pixels 18 to 26 are continuous adjacent pixels. When dividing each of the pixels 18 to 26 of the row 16 into a bright portion or a dark portion, a corresponding luminance reference value $B_{ref}$ of each of the pixels 18 to 26 is calculated firstly. Taking the pixel 22 as an example, the luminance reference value $B_{ref}(\mathbf{22})$ of the pixel 22 is calculated based on a following equation:

$$B_{ref}(22)=[B(20)-B(22)]+[B(21)-B(22)]+[B(23)-B(22)]+[B(24)-B(22)] \quad (1)$$

where B(20), B(21), B(22), B(23) and B(24) are respectively the luminance values of the pixels 20 to 24. Therefore, the luminance reference value $B_{ref}(\mathbf{22})$ of the pixel 22 may be simplified as [B(20)+B(21)+B(23)+B(24)−4×B(22)]. Furthermore, the above method for calculating the luminance reference value of a specific pixel may be applied to all the pixels in the image. For each of the pixels, the luminance reference value $B_{ref}$ thereof may be represented by a following equation:

$$B_{ref}=(Bt-N_1\times Bp) \quad (2)$$

where Bt is a summation of luminance values of $N_1$ pixels located adjacent to the target pixel, Bp is the luminance value of the target pixel, and $N_1$ is a positive integer. For example, taking the pixel 22 as an example, Bp=B(22), $N_1$=4, and Bt=[B(20)+B(21)+B(23)+B(24)]. Certainly, the positive integer $N_1$ of the present invention does not have to be 4, and $N_1$ could be any positive integer.

Figure 5:
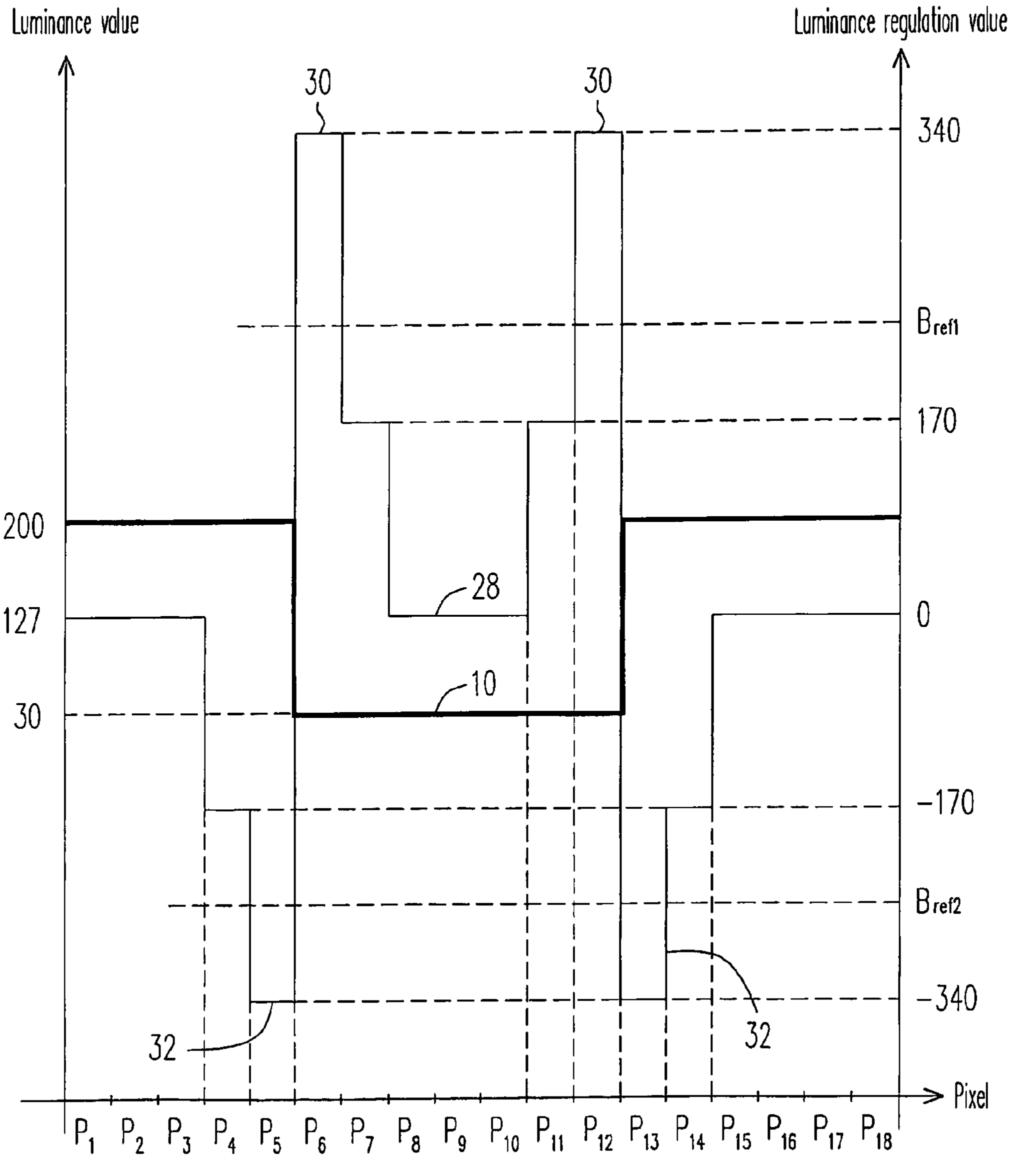
FIG. 5 is a diagram illustrating a relation between luminance values and luminance reference values of pixels according to a preferred embodiment of the present invention.

When the luminance reference value of each of the pixels is calculated according to the aforementioned method, it is determined whether the corresponding pixel belongs to the bright portion or the dark portion according to the calculated luminance reference value $B_{ref}$. For example, when the luminance value $B_{ref}$ of the pixel is greater than zero, it represents the pixel is darker than its adjacent pixels, and when the luminance value $B_{ref}$ of the pixel is less than zero, it represents the pixel is brighter than the adjacent pixels. Therefore, the luminance values $B_{ref}$ of the pixels located at junction of the bright portion and the dark portion may be varied acutely. Referring to FIG. 2, all of the luminance values of the pixels $P_1$ to $P_5$ in the bright portion are 200, and all of the luminance values of the pixels $P_6$ to $P_{12}$ in the dark portion are 30. Therefore, after calculation, the luminance reference values $B_{ref}$ of the pixels $P_3$ to $P_9$ are respectively 0, −170, −340, 340, 170, 0 and 0. If represented by a figure, the luminance reference values $B_{ref}$ of the pixels $P_1$ to $P_{18}$ are then illustrated as that shown in FIG. 5, wherein the bold solid line 10 represents the luminance values of the pixels, and the non-bold solid line 28 represents the luminance reference values $B_{ref}$ of the pixels. According to FIG. 5, it is obvious that the luminance reference values of the two pixels $P_6$ and $P_{12}$ in the dark portion located adjacent to the bright portions are 340, and the luminance reference values of the pixels $P_5$ and $P_{13}$ respectively located adjacent to the pixels $P_6$ and $P_{12}$ are −340. Accordingly, two wave crests 30 of the luminance reference values in the dark portion, and two wave troughs 32 of the luminance reference values in two bright portions are respectively determined, wherein the wave crests 30 and the wave troughs 32 are determined by respectively comparing the luminance reference value $B_{ref}$ of the pixel to a first predetermined reference threshold value $B_{ref1}$ and a second predetermined reference threshold value $B_{ref2}$. Wherein, the first predetermined reference threshold value $B_{ref1}$ is greater than the second predetermined reference threshold value $B_{ref2}$, and the second predetermined reference threshold value $B_{ref2}$ may be a negative value of the first predetermined reference threshold value $B_{ref1}$, as shown in FIG. 5. When the luminance reference value $B_{ref}$ is greater than the first predetermined reference threshold value $B_{ref1}$ the luminance reference value $B_{ref}$ may be regarded as the wave crest 30; when the luminance reference value $B_{ref}$ is less than the second predetermined reference threshold value $B_{ref2}$, the luminance reference value $B_{ref}$ may be regarded as the wave trough 32. As shown in FIG. 5, whether a certain pixel in the image belongs to a bright portion or a dark portion then may be determined according to a relative position of the wave crests 30 and the wave troughs 32 in the image. For example, the pixels between two wave crests 30 may be determined to belong to a dark portion. Moreover, it should be noted that the luminance reference value $B_{ref}$ of a pixel between the two wave crests 30 may be less than zero but the pixel is not one of the wave troughs 32. However, if the luminance reference value $B_{ref}$ of the pixel is less than the second predetermined reference threshold value $B_{ref2}$, such pixel is still regarded to a dark portion. Conversely, the luminance reference value $B_{ref}$ of a pixel between the two wave troughs 32 may be greater than zero but the pixel is not one of the wave crests 30. However, if the luminance reference value $B_{ref}$ of the pixel is less than the first predetermined reference threshold value $B_{ref1}$, such pixel is still regarded to the bright portion.

In another embodiment of the present invention, after the luminance reference value $B_{ref}$ of each of the pixels is calculated, a factor pair of each of the pixels is calculated based on the calculated luminance reference value $B_{ref}$. Each of the factor pairs includes a main factor P(m) and a sub factor P(s), and a relation there between may be represented by following equations:

$$P(m) = \begin{cases} B_{ref}, \text{ when } (B_{ref} > 0) \\ 0, \text{ when } (B_{ref} \le 0) \end{cases} \quad (3)$$

$$P(s) = \begin{cases} -B_{ref}, \text{ when } (B_{ref} < 0) \\ 0, \text{ when } (B_{ref} \ge 0) \end{cases} \quad (4)$$

Figure 6:
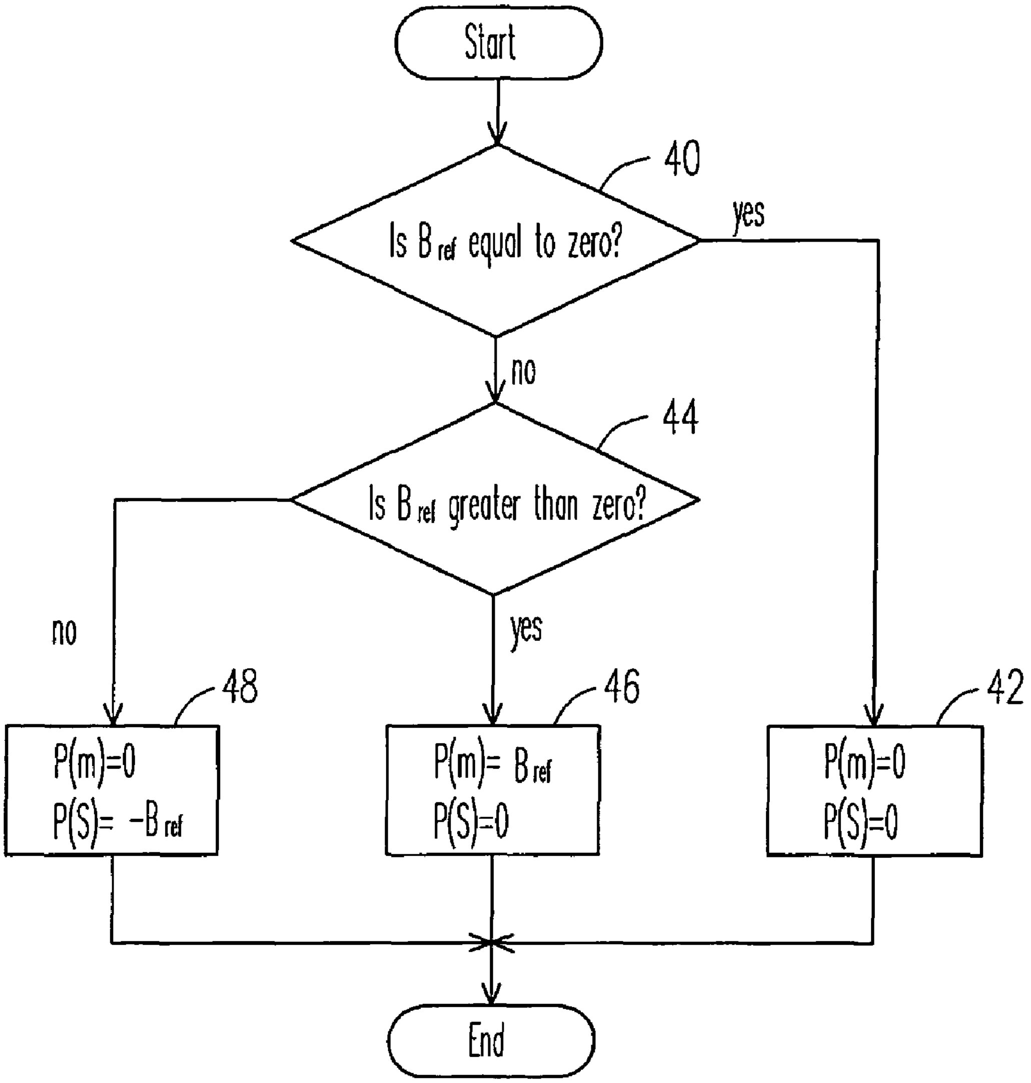
FIG. 6 is a flowchart illustrating a method of calculating main factors and sub factors.

According to the above equations, for each of the pixels, if the luminance reference value $B_{ref}$ of the pixel is greater than zero, the main factor P(m) of the pixel is equal to the luminance reference value $B_{ref}$ and the sub factor P(s) of the pixel is equal to zero; if the luminance reference value $B_{ref}$ of the pixel is less than or equal to zero, the main factor P(m) of the pixel is equal to zero, and the sub factor P(s) of the pixel is equal to a negative value (i.e. $-B_{ref}$) of the luminance reference value $B_{ref}$. In detail, the method of calculating the corresponding main factor P(m) and the sub factor P(s) based on the calculated luminance reference value $B_{ref}$ is shown as a flowchart in FIG. 6. Firstly, in step 40, it is determined whether the luminance reference value $B_{ref}$ is equal to zero. If the luminance reference value $B_{ref}$ is equal to zero, step 42 is executed, by which the main factor P(m) and the sub factor P(s) are set to zero; however, if the luminance reference value $B_{ref}$ is not equal to zero, step 44 is executed, by which whether the luminance reference value $B_{ref}$ is greater than zero is determined. If the luminance reference value $B_{ref}$ is greater than zero, step 46 is executed, by which the main factor P(m) is set to be the luminance reference value $B_{ref}$, and the sub factor P(s) is set to zero; however, if the luminance reference value $B_{ref}$ is not greater than zero, step 48 is executed, by which the main factor P(m) is set to zero and the sub factor P(s) is set to be the negative value of the luminance reference value $B_{ref}$.

Figure 7:
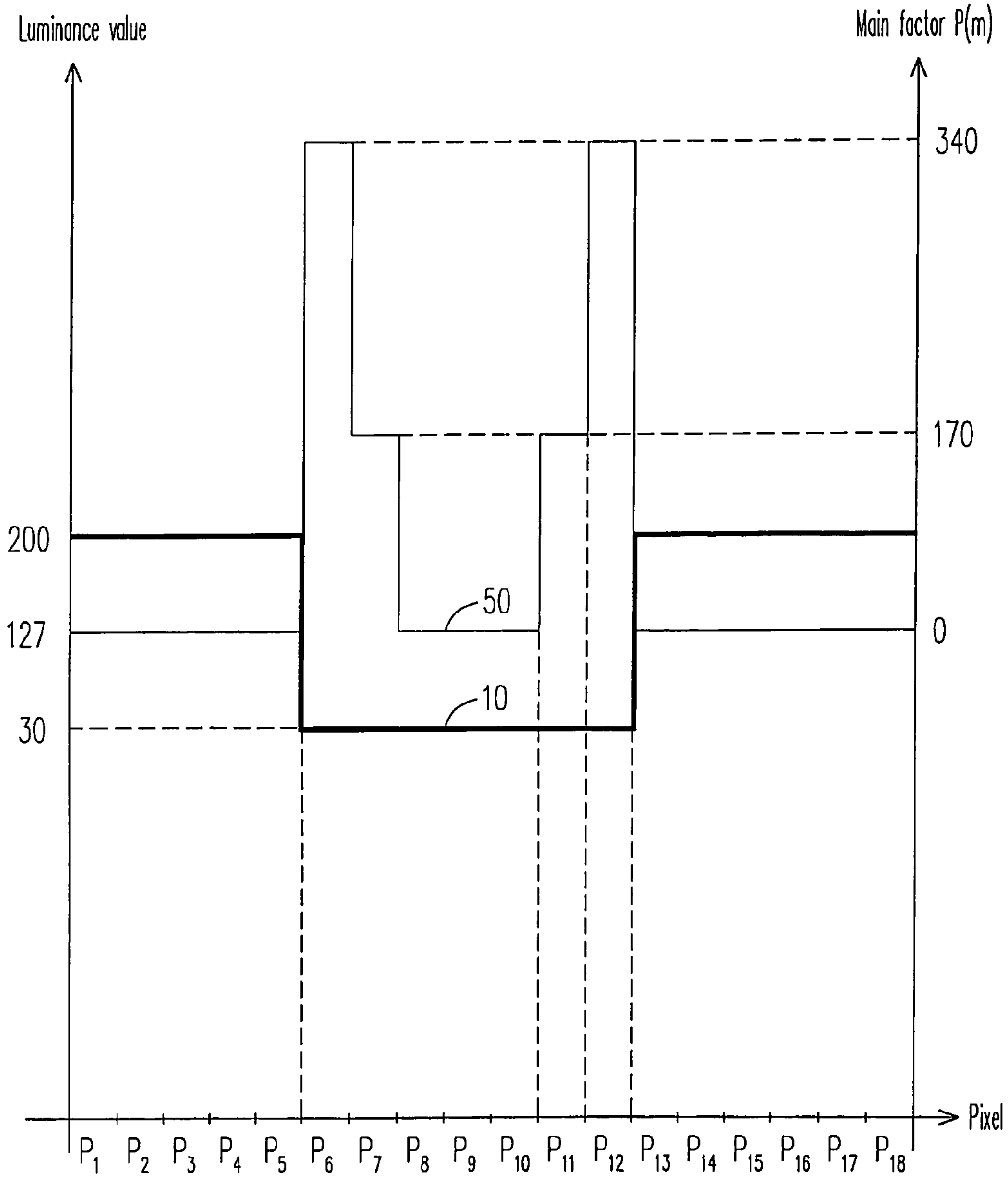
FIG. 7 is a diagram illustrating a relation between luminance values and main factors of pixels according to a preferred embodiment of the present invention.
Figure 8:
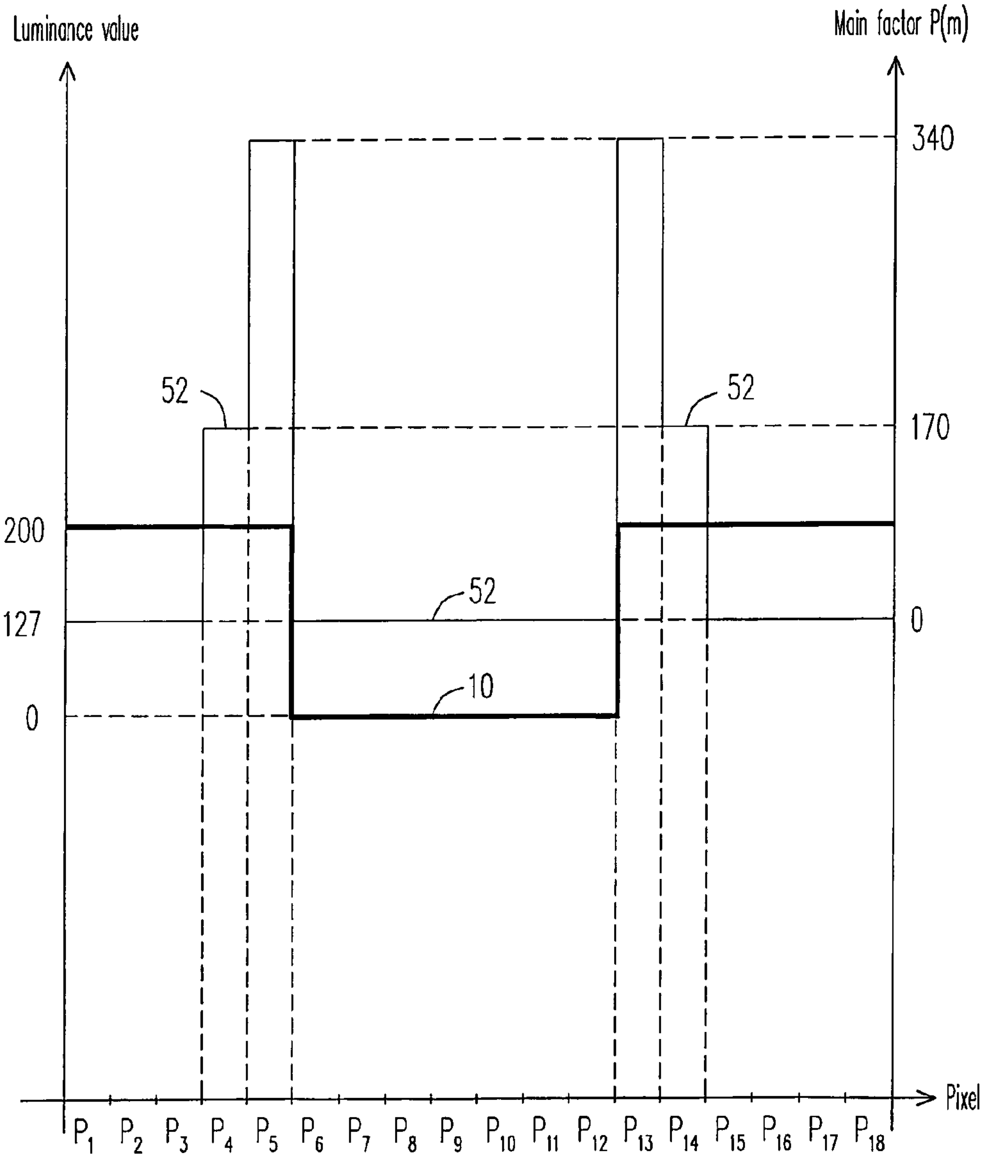
FIG. 8 is a diagram illustrating a relation between luminance values and sub factors of pixels according to a preferred embodiment of the present invention.

Therefore, if relations of the pixels and the luminance reference values $B_{ref}$ thereof in FIG. 5 are transformed into be relations of the pixels and the main factors P(m) and the sub factors P(s) thereof, FIG. 7 and FIG. 8 would be obtained. Wherein, the non-bold solid line 50 in FIG. 7 represents the main factor P(m) corresponding to each of the pixels, and the non-bold solid line 52 in FIG. 8 represents the sub factors P(s) corresponding to each of the pixels. According to FIG. 7 and FIG. 8, it is known that the main factor P(m) and the sub factor P(s) of each pixel are not all non-zero.

Moreover, it should be noted that the main factor P(m) and the sub factor P(s) are set to be a positive value or a negative value of $B_{ref}$, and may be adjusted according to different definitions of the luminance reference value $B_{ref}$. For example, if the definition of the luminance reference value $B_{ref}$ is changed from ($Bt-N_1 \times Bp$) to ($N_1 \times Bp-Bt$), the equations representing the main factor P(m) and the sub factor P(s) are then changed to be:

$$P(m) = \begin{cases} -B_{ref}, \text{ when } (B_{ref} > 0) \\ 0, \text{ when } (B_{ref} \le 0) \end{cases} \quad (5)$$

$$P(s) = \begin{cases} B_{ref}, \text{ when } (B_{ref} < 0) \\ 0, \text{ when } (B_{ref} \ge 0) \end{cases} \quad (6)$$

Briefly, when $B_{ref}$ is equal to ($N_1 \times Bp-Bt$), and if the luminance reference value $B_{ref}$ of the pixel is greater than zero, the main factor P(m) of the pixel is equal to the negative value of the luminance reference value $B_{ref}$, i.e. $-B_{ref}$, and the sub factor P(s) of the pixel is equal to zero; if the luminance reference value $B_{ref}$ of the pixel is less than or equal to zero, the main factor P(m) of the pixel is equal to zero, and the sub factor P(s) of the pixel is equal to the luminance reference value $B_{ref}$. Furthermore, operations of the luminance values, the luminance reference values, the positive factors, the negative factors and the chrominances, etc. are not limited to the aforementioned positive or negative valuing method, and meanwhile the marked positive and negative symbols of such values are also not limited, and various value translation operations may be applied.

Figures 9, 10:
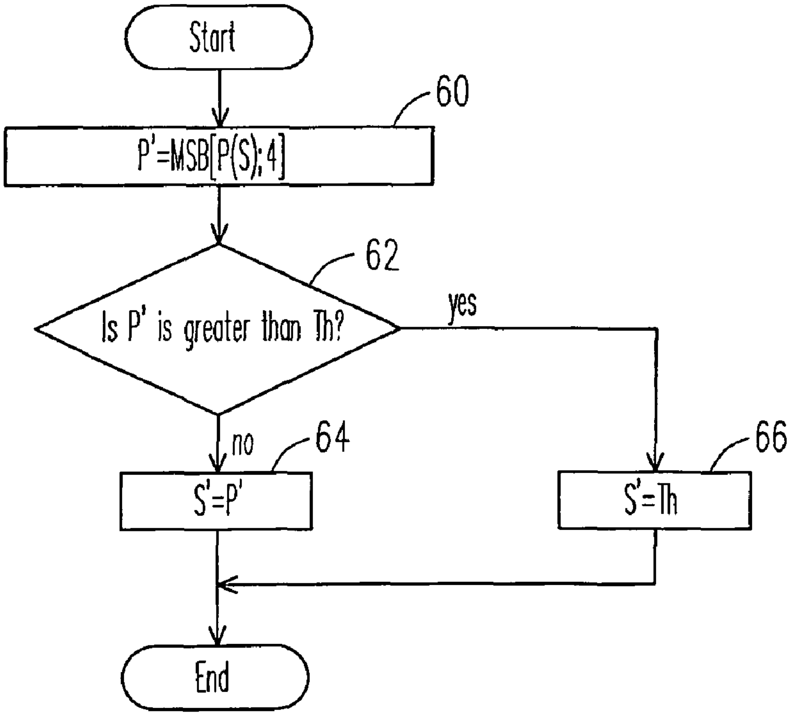
FIG. 9 is a diagram illustrating a relation between quantified values and two coefficients.
FIG. 10 is a flowchart illustrating a method of quantifying sub factors according to a preferred embodiment of the present invention.

When the main factor P(m) and the sub factor P(s) of each of the pixels are calculated, a luminance enhancement value Be of the pixel is calculated according to the main factor and the sub factor of the pixel, and the main factors and the sub factors of the pixels located adjacent to the pixel. If represented by an equation, a luminance enhancement value Be(y) of a pixel y then may be represented by a following equation:

$$Be(y) = P(m, y-1) \times \frac{\alpha}{4} + P(m, y) \times \frac{\beta}{4} + P(m, y) \times \frac{1}{2} \quad (7)$$

where P(m,y−1) represents a main factor of a previous adjacent pixel of the pixel y, P(m,y) represents the main factor of the pixel y, the coefficients α and β relate to a relation of the sub factor P(s) of the pixel y and a quantified value S', and the relation between the coefficients α and β and the quantified value S' is shown as FIG. 9. The value S' is a quantified result of the sub factor P(s). FIG. 10 is a flowchart illustrating a process of quantifying the sub factor P(s) to be the value S'.

Figure 11:
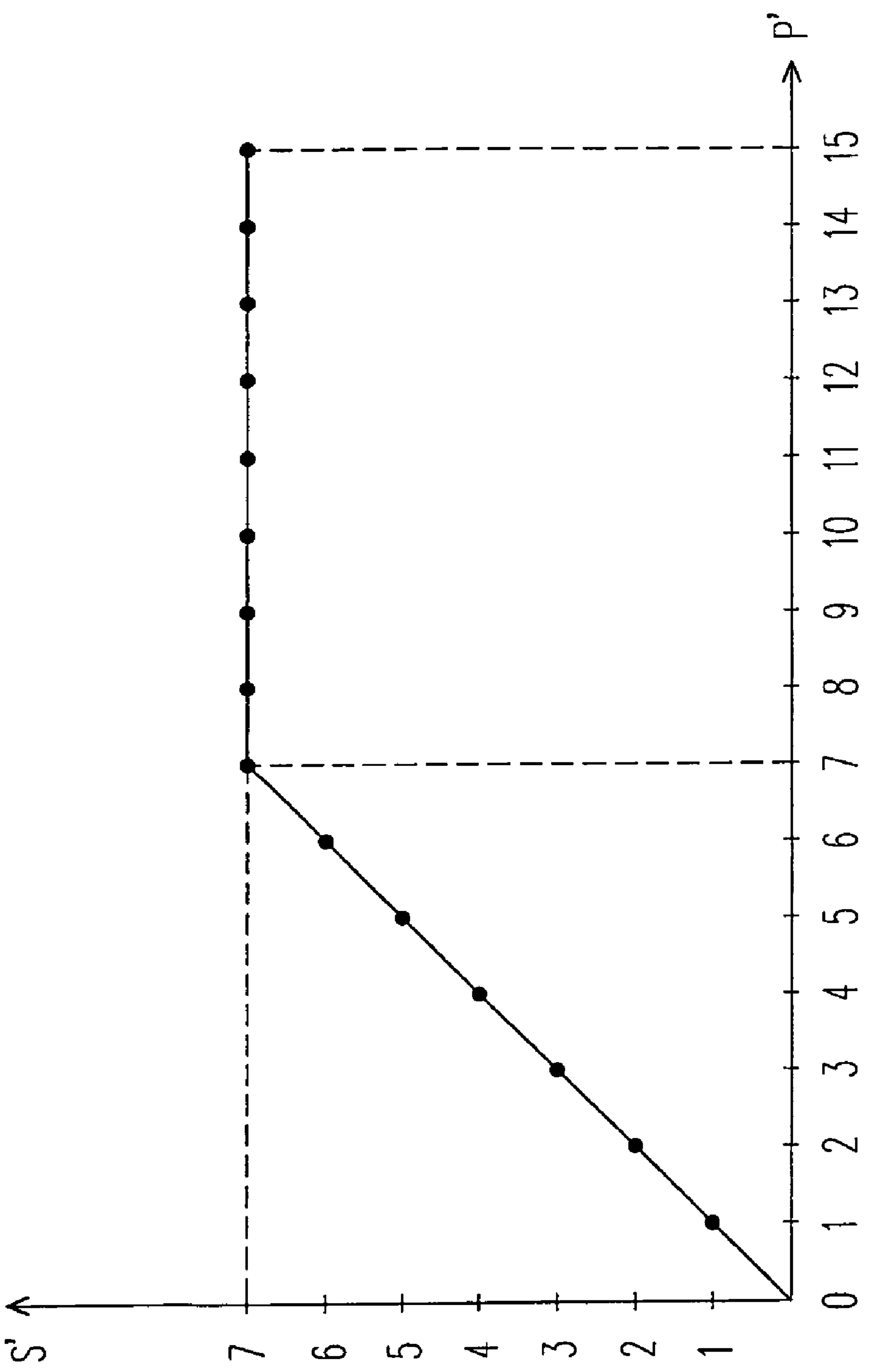
FIG. 11 is a diagram illustrating a relation between values P' and quantified values S' shown in FIG. 10.

Referring to FIG. 10, during quantifying of the sub factor P(s), a step 60 is executed firstly, in which the sub factor P(s) is processed with a most significant bit (MSB) processing to obtain 4 MSBs of the sub factor P(s). Next, in step 62, a value P' representing the 4 MSBs is compared to a quantified threshold value Th, and if the value P' is less than or equal to the quantified threshold value Th, the quantified value S' of the sub factor P(s) is equal to the value P' (step 64); if the value P' is greater than Th, the quantified value S' is equal to Th (step 66). In the present embodiment, the quantified threshold value Th is set to be 7. Furthermore, since the value P' is obtained by obtaining the 4 MSBs of the sub factor P(s), so that $0 \leqq P' \leqq 15$. As shown in FIG. 11, if $8 \leqq P' \leqq 15$, S'=7; and if $0 \leqq P' \leqq 7$, S'=P'.

Referring to FIG. 9 and FIG. 11, the smaller the quantified value S' is, the larger the coefficient α is, and the smaller the coefficient β is; conversely, the larger the quantified value S' is, the smaller the coefficient α is, and the larger the coefficient β is. Regarding the relation between the quantified value S' and the coefficients α and β, in view of the value P', a following relation is obtained. If $7 \leqq P' \leqq 15$, α=0 and β=2; if $0 \leqq P' \leqq 7$, the smaller the value P' is, the larger the corresponding coefficient α is, and the smaller the corresponding coefficient β is. However, since the value P' is the 4 MSBs of the sub factor P(s), the larger the sub factor P(s) is, the smaller the corresponding coefficient α is, and the larger the corresponding coefficient β is, and accordingly, the smaller a calculation weight of the main factors of the adjacent pixels for the luminance enhancement value Be of the corresponding pixel is; the smaller the sub factor P(s) is, the larger the corresponding coefficient α is, and the smaller the corresponding coefficient β is, and accordingly, the larger the calculation weight of the main factors of the adjacent pixels for the luminance enhancement value Be of the corresponding pixel is.

Figure 12:
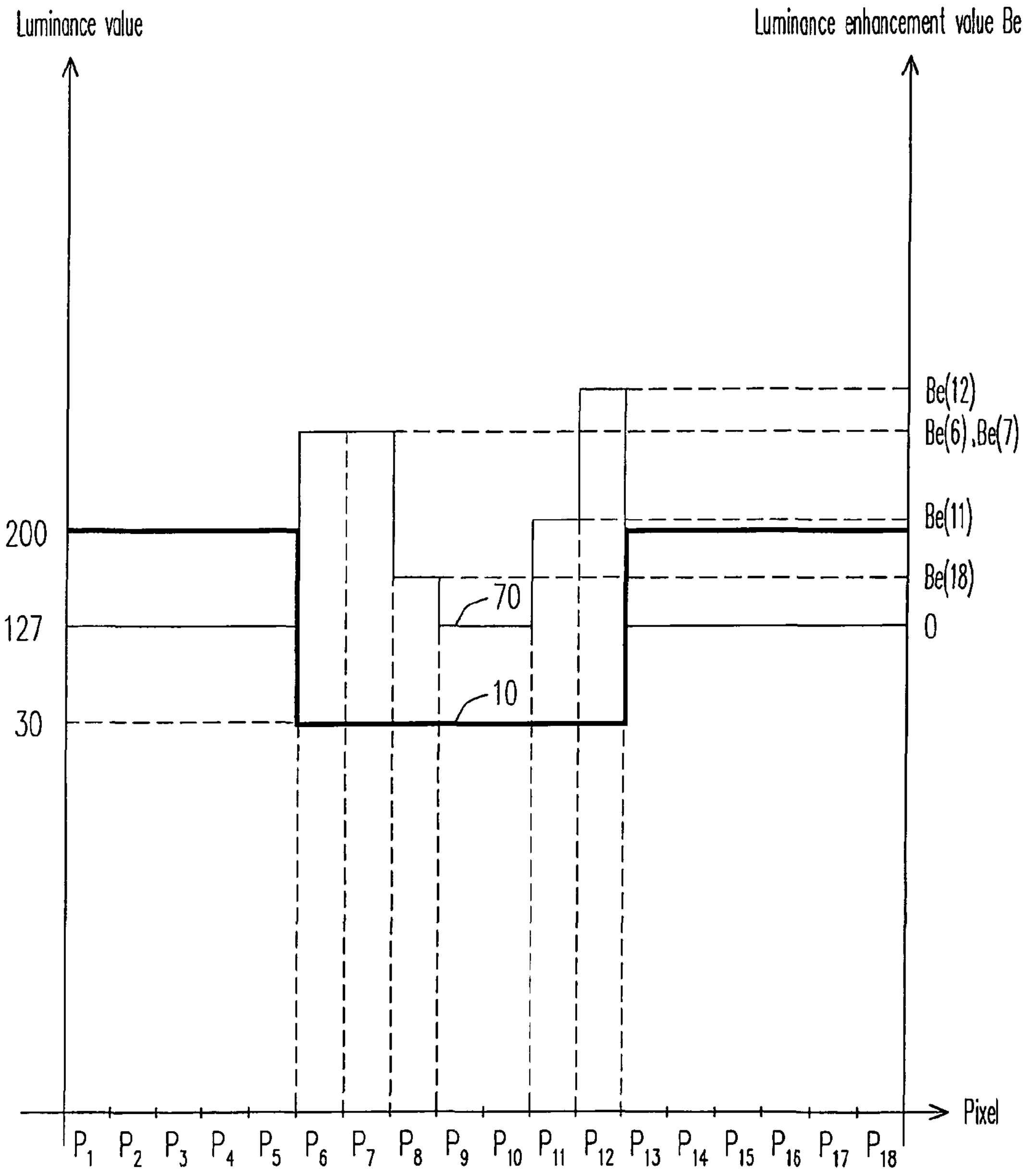
FIG. 12 is a diagram illustrating a relation between luminance values and luminance enhancement values of pixels according to a preferred embodiment of the present invention.

Based on settings of the coefficients α and β in FIG. 9, and based on the definition of the luminance enhancement value in the above equation (7), the main factor P(m) and the sub factor P(s) of each pixel shown in FIG. 7 and FIG. 8 may be transformed into the luminance enhancement value Be of the pixel, which is shown as a non-bold solid line 70 in FIG. 12. Wherein, based on the equation (7), the luminance enhancement value Be(6) of the pixel $P_6$ is equal to $$\left(0\times\frac{1}{4}+340\times\frac{1}{4\times128}+340\times\frac{1}{2}\right),$$

and a value thereof is about 170. Similarly, the luminance enhancement values Be(7), Be(8), Be(9), Be(10), Be(11) and Be(12) of the pixels $P_7$, $P_8$, $P_9$, $P_{10}$, $P_{11}$ and $P_{12}$ are respectively 170, 42.5, 0, 0, 85 and 213.

When the luminance enhancement value Be of each pixel is calculated, the luminance of the corresponding pixel then may be adjusted according to the calculated luminance enhancement value Be. During adjustment of the luminance of the pixel, an addition operation or a subtraction operation is performed based on whether the pixel is located in a bright portion or in a dark portion. In detail, if the pixel is located in a bright portion, the adjusted luminance value of the pixel is equal to a sum of the original luminance value of the pixel and the corresponding luminance enhancement value Be, i.e. the luminance regulation value of the pixel is equal to the luminance enhancement value Be of the pixel; if the pixel is located in a dark portion, the adjusted luminance value of the pixel is equal to an result of subtracting the corresponding luminance enhancement value Be from the original luminance value of the pixel, i.e. the luminance regulation value of the pixel is equal to a negative value (i.e. −Be) of the luminance enhancement value Be of the pixel. Therefore, for a document with the background being brighter than the texts, the light intensity of the texts may be decreased for enhancing the displaying of the texts, and meanwhile the luminance of the background is maintained unchanged to avoid an adverse effect such as ringing. Accordingly, the document with the enhanced texts displaying is convenient for the user to read. Conversely, for a document with the background being darker than the texts, the luminance of the background may be decreased for improving a contrast between the texts and the background, so as to strengthen the displaying of the texts. Moreover, during adjustment of the luminance of the pixel, if the calculated adjusted luminance value exceeds predetermined upper and lower limits of the system, the adjusted luminance value then is set to be the predetermined upper limit or the lower limit of the system. For example, in case that the predetermined luminance upper limit and the lower limit of the system are respectively 255 and 0, if the calculated adjusted luminance value is −30, the luminance value of the pixel to be adjusted is actually set to the lower limit 0.

Figure 13:
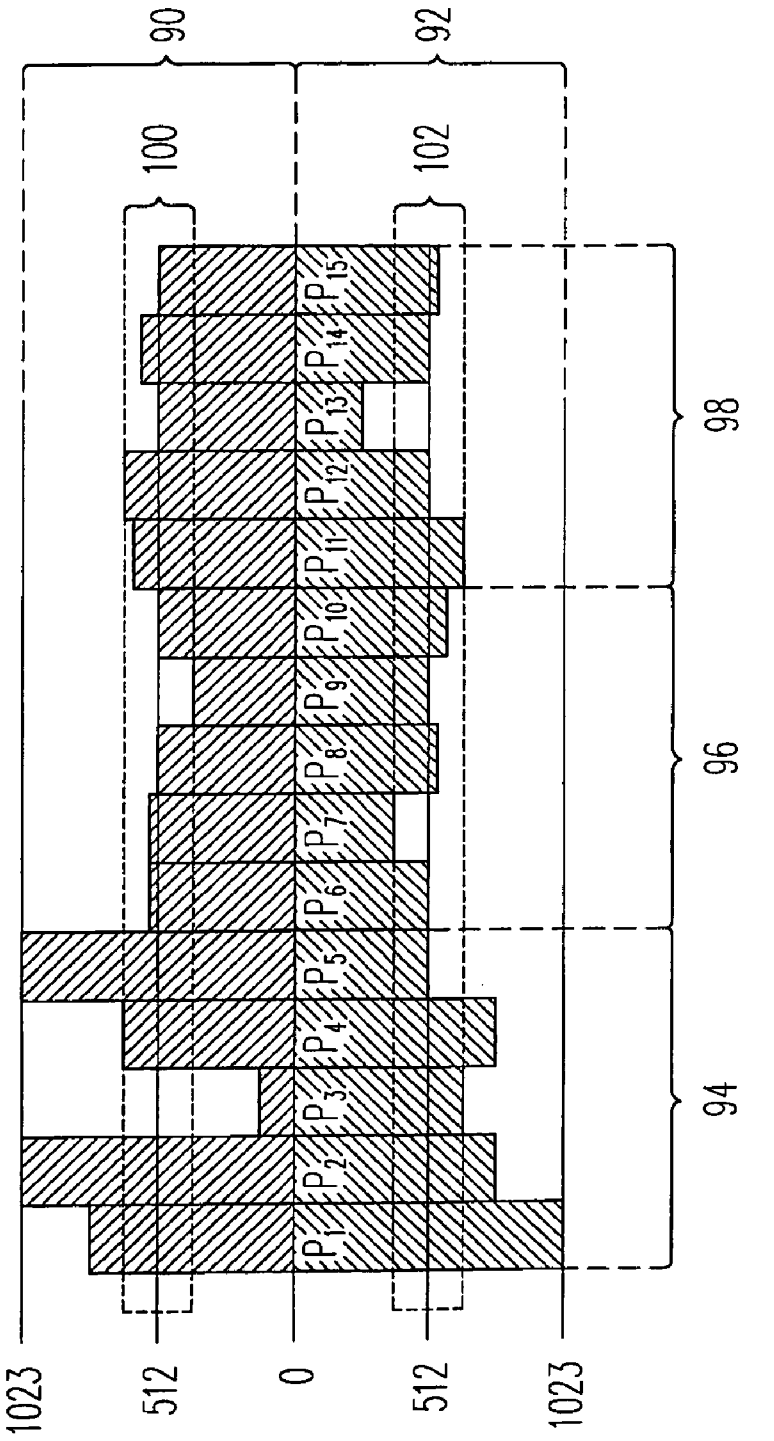
FIG. 13 is a diagram illustrating a relation between luminance values and first chrominance values and second chrominance values of pixels according to a preferred embodiment of the present invention.

In another embodiment of the present invention, an image processing method is disclosed, in which besides the displaying of the texts is enhanced based on the aforementioned method, chrominance information of the image is further considered to avoid a distortion of the image during enhancing the displaying of the texts, when the image simultaneously having the texts and pictures are processed. Referring to FIG. 13, FIG. 13 is a bar chart illustrating chrominances Cb and Cr of the pixels $P_1$ to $P_{12}$. Each pixel has a corresponding chrominance, and the chrominance of each pixel is represented by a first chrominance value Cb and a second chrominance value Cr. In FIG. 13, a region 90 represents the first chrominance value Cb of each pixel, and a region 92 represents the second chrominance value Cr of each pixel. Generally, the first chrominance value Cb and the second chrominance value Cr are values within a range of −512 to 511. For simplicity's sake, in the present embodiment, a value shift procedure is performed firstly to shift the first chrominance value Cb and the second chrominance value Cr, i.e. the first chrominance value Cb and the second chrominance value Cr of each pixel are added with 512 firstly such that all the first chrominance values Cb and the second chrominance values Cr are larger than or equal to zero. The first chrominance values Cb and the second chrominance values Cr shown in the regions 90 and 92 are shifted values by adding with 512, wherein the value 512 is defined to be a chrominance reference value $C_{ref}$ in the present invention. The regions 90 and 92 are respectively marked with low chrominance areas 100 and 102, and each of the low chrominance areas 100 and 102 respectively defines the first chrominance values Cb and the second chrominance values Cr within a predetermined range. In the present embodiment, the predetermined range is 512±32. Namely, the low chrominance areas 100 and 102 respectively define the first chrominance values Cb and the second chrominance values Cr having values thereof being within the range of 480 to 544. However, if the first chrominance values Cb and the second chrominance values Cr are not shifting by adding the chrominance reference value $C_{ref}$, a range of an original first chrominance Cb and an original second chrominance Cr corresponding to the low chrominance areas 100 and 102 are respectively −32 to 32. Moreover, since the first chrominance values Cb and the second chrominance values Cr of general grayscale pixels are mostly within the low chrominance areas 100 and 102, it could be distinguished whether a pixel belongs to a text portion or a picture area by determining a difference between the chrominance of the pixel and the chrominance reference value Cref. For example, referring to FIG. 12 and FIG. 13, in FIG. 12, the luminance enhancement values of the pixels $P_6$ to $P_9$, $P_{11}$ and $P_{12}$ are all greater than zero, and in FIG. 13, the first chrominance values Cb and the second chrominance values Cr of the pixels $P_6$ to $P_9$, $P_{11}$ and $P_{12}$ are respectively within the low chrominance areas 100 and 102. Therefore, the pixels $P_6$ to $P_9$, $P_{11}$ and $P_{12}$ may be double confirmed to belong to a text portion. However, if the first chrominance values Cb and the second chrominance values Cr of the pixels $P_6$ to $P_9$, $P_{11}$ and $P_{12}$ fall within a range outside the low chrominance areas 100 and 102, the luminance values of the pixels $P_6$ to $P_9$, $P_{11}$ and $P_{12}$ are then restricted from any change to avoid the image distortion caused by misjudgement.

In another embodiment of the present invention, before the luminance values of the pixels are adjusted, it is determined whether there is any picture area within the image according to the chrominance information of the pixels. If the image has any picture area, it is further determined whether the picture area is overlapped with any bright portion (or dark portion) that has one or more pixels with the luminance value need adjustment. If the bright portion (or the dark portion) is overlapped with the picture area, the luminance values of the pixels within an overlapped area of the bright portion (or the dark portion) and the picture area are restricted from adjustment, or all the pixels within the bright portion (or the dart portion) are restricted from adjustment to reduce a chance of the image distortion.

Regarding how to determine whether there is any picture area in the image according to the chrominance information of the pixels, besides the previously mentioned approach of determining whether the first chrominance values Cb and the second chrominance values Cr fall within the low chrominance areas 100 and 102, another approach of calculating chrominance difference reference values $C_{diff}$ of a plurality of blocks in the image may also be applied. During calculating the chrominance difference reference values $C_{diff}$, the image is divided into a plurality of the blocks firstly. As shown in FIG. 13, the pixels $P_1$ to $P_{15}$ are grouped into three blocks 94, 96 and 98, and each of the block 94, 96 and 98 contains five adjacent pixels. Regarding each of the blocks 94, 96 and 98, the chrominance difference reference value $C_{diff}$ of the block may be obtained according to a following equation:

$$C_{diff} = \sum_{i=1}^{N_2} [|(Cb(i) - C_{ref})| + |(Cr(i) - C_{ref})|] \tag{8}$$

where Cb(i) and Cr(i) are respectively the shifted first chrominance value Cb and the shifted second chrominance value Cr of an i-th pixel within the block, $C_{ref}$ is the chrominance reference value, and $N_2$ is a total pixel number of the block. In the present embodiment, the chrominance reference value $C_{ref}$ is 512, and the total pixel number $N_2$ of each block is 5. After the chrominance difference reference value $C_{diff}$ of the block is calculated, the chrominance difference reference value $C_{diff}$ is compared to a difference threshold value $C_{th}$ to determine whether the chrominance difference reference value $C_{diff}$ is greater than the difference threshold value $C_{th}$. If the chrominance difference reference value $C_{diff}$ is greater than the difference threshold value $C_{th}$, it is determined that the block is within a picture area; conversely, if the chrominance difference reference value $C_{diff}$ is less than or equal to the difference threshold value $C_{th}$, it is determined that the block is not within the picture area. In the present invention, the chrominance reference value Cref and the difference threshold value $C_{th}$ may be set to fit different requirements, and in the present embodiment, the chrominance reference value Cref is set to be 512, and the difference threshold value $C_{th}$ is set to be 128. For example, in FIG. 13, assuming the chrominance difference reference values $C_{diff}$ of the blocks 94, 96 and 98 are respectively 750, 100 and 85, then it is determined that the block 94 is within the picture area and that the blocks 96 and 98 are not within the picture area.

Moreover, in case that the texts in the image have non-grayscale color (for example blue or red), the chrominance reference value $C_{ref}$ may be selected from a plurality of chrominance setting values, so that enhancing of the text displaying may fit different requirements.

Figure 14:
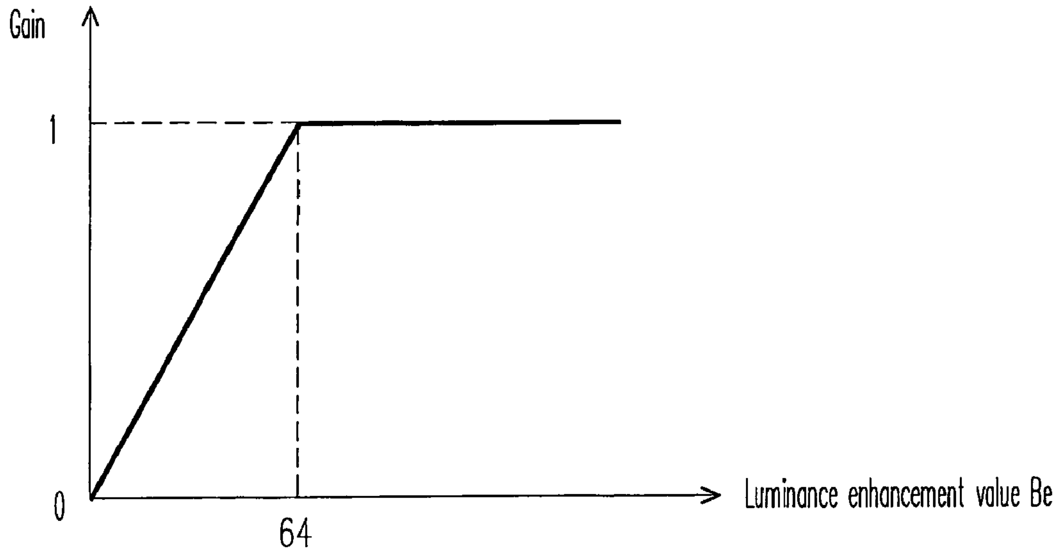
FIG. 14 is a diagram illustrating a relation between luminance enhancement values and gains.

On the other hand, to obtain a clean processed image, in another embodiment of the present invention, the smaller luminance enhancement values Be are processed by a noise filtering process, and then the luminance values of the pixels are adjusted according to the processed luminance enhancement values Be. Referring to FIG. 14, FIG. 14 is a diagram illustrating relations of the luminance enhancement values Be and gains of a gain controller. As shown in FIG. 14, when the luminance enhancement value Be is greater than a threshold value Nth, the gain thereof is equal to 1, i.e. the luminance enhancement value Be maintains its original value after the noise filtering process. Moreover, when the luminance enhancement value Be is less than the threshold value Nth, the gain thereof is less than 1, and the gain thereof is proportional to the luminance enhancement value Be, i.e. the smaller the luminance enhancement value Be is, the smaller the gain thereof is.

Figure 15:
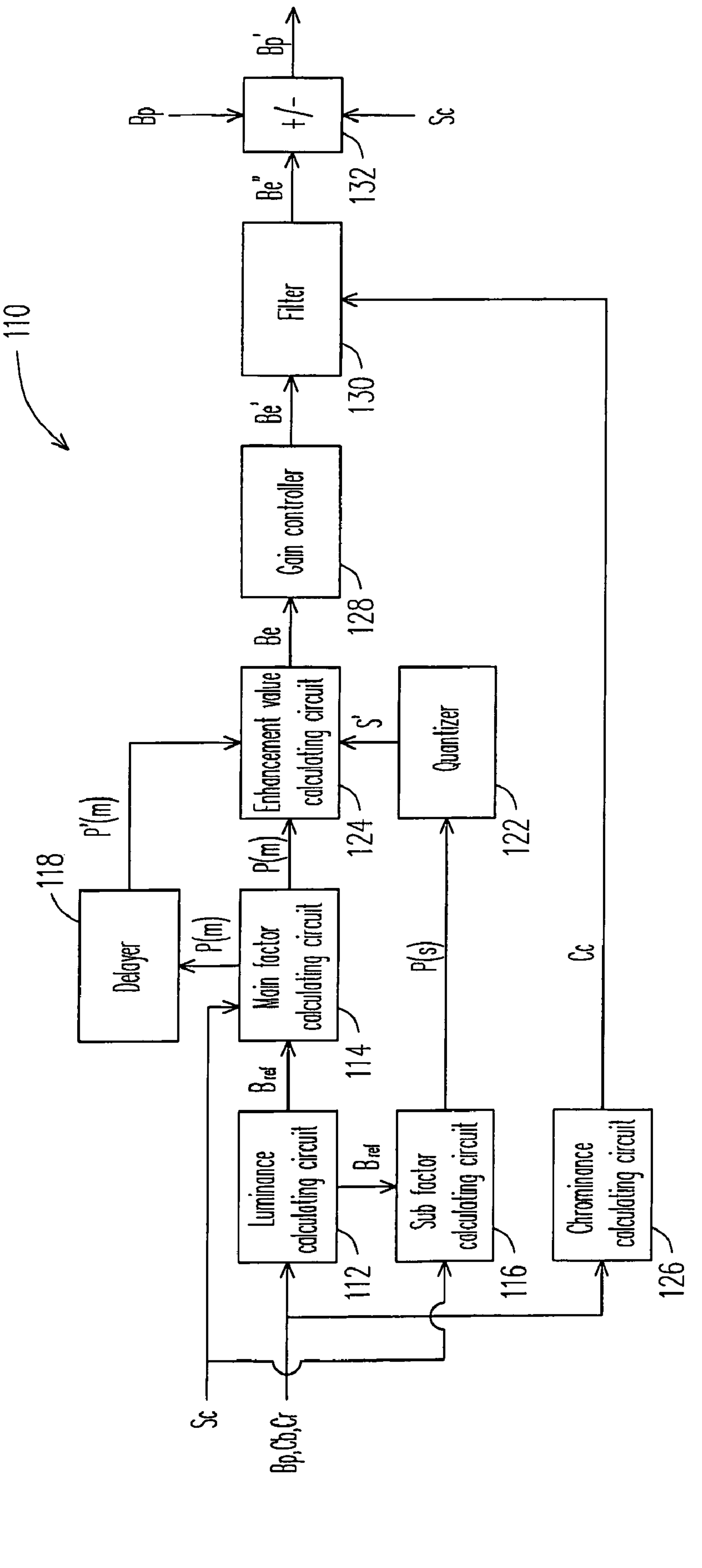
FIG. 15 is a functional block diagram of an image processing circuit designed according to an embodiment of the present invention.

Referring to FIG. 15, FIG. 15 is a functional block diagram of an image processing circuit 110 designed according to an embodiment of the present invention. The image processing circuit 110 is used to adjust the luminance values of the pixels according to the luminance values Bp, the first chrominance values Cb and the second chrominance values Cr in image signals of the image. The image processing circuit 110 includes a luminance calculating circuit 112 and a chrominance calculating circuit 126. The luminance calculating circuit 112 calculates the luminance reference value $B_{ref}$ according to the received luminance value Bp, and the chrominance calculating circuit 126 determines whether the pixel belongs to the picture area according to the first chrominance value Cb and the second chrominance value Cr. If it is determined that the pixel belong to the picture area, the voltage level of an output control signal Cc of the chrominance calculating circuit 126 is high; if it is determined that the pixel does not belong to the picture area, the voltage level of the output control signal Cc of the chrominance calculating circuit 126 is low. The luminance calculating circuit 112 transmits the luminance reference value $B_{ref}$ to a main factor calculating circuit 114 and a sub factor calculating circuit 116. The main factor calculating circuit 114 outputs the main factor P(m) of the pixel according to the luminance reference value $B_{ref}$, and the sub factor calculating circuit 116 outputs the sub factor P(s) according to the luminance reference value $B_{ref}$. The main factor P(m) output from the main factor calculating circuit 114 is delayed by a delayer 118, and the delayed main factor P'(m) is transmitted to a enhancement value calculating circuit 124. Wherein, if the P(m) is assumed to be the main factor of a target pixel with the luminance value thereof to be adjusted, then the P'(m) is the main factor of a previous pixel prior to the target pixel. Moreover, the sub factor P(s) output from the sub factor calculating circuit 116 is quantified by a quantizer 122 and then is transformed into a quantified value S'. Next, the enhancement value calculating circuit 124 calculates the luminance enhancement value Be according to the main factor P(m), the delayed main factor P'(m) and the quantified value S'. The luminance enhancement value Be output from the enhancement value calculating circuit 124 is transmitted to a gain controller 128 for gain controlling performed based on the threshold value Nth, and outputting a processed luminance enhancement value Be'. Next, a filter 130 filters the luminance enhancement value Be' output from the gain controller 128 according to the control signal Cc output from the chrominance calculating circuit 126. In detail, when the voltage level of the control signal Cc is low, a luminance enhancement value Be" output from the filter 130 is equal to the luminance enhancement value Be'. When the voltage level of the control signal Cc is high, i.e. when it is determined that the pixel belong to the picture area, the luminance enhancement value Be" output from the filter 130 is equal to zero. Finally, a luminance enhancement circuit 132 adjusts the original luminance value Bp according to the luminance enhancement value Be" and outputs an adjusted luminance value Bp'. Moreover, to facilitate processing of different images, the image processing circuit 110 further includes a signal terminal for receiving a control signal Sc. The control signal Sc may be transmitted to the main factor calculating circuit 114, the sub factor calculating circuit 116 and the luminance enhancement circuit 132. When the voltage level of the control signal Sc is low, operations of the devices of the image processing circuit 110 is the same to the aforementioned description. For example, for an image with white background and black texts, the adjusted luminance value Bp' is equal to the result of subtracting the luminance enhancement value Be" from the original luminance value Bp, so that the text portion of the image becomes darker. However, when the voltage level of the control signal Sc is high, operations of the main factor calculating circuit 114, the sub factor calculating circuit 116 and the luminance enhancement circuit 132 are varied, so that the main factor P(m) is altered to be equal to the original sub factor P(s), and the sub factor P(s) is altered to be equal to the original main factor P(m). In such case, for the image with the white background and the black texts, the adjusted luminance value Bp' is equal to a sum of the original luminance value Bp and the luminance enhancement value Be", and the background portion thereof becomes brighter.

In an embodiment of the present invention, the image processing circuit 110 may be further simplified, and the luminance value of the target pixel may be adjusted only according to the main factor P(m), the sub factor P(s) and the main factor P'(m) of the previous pixel.

Figure 16:
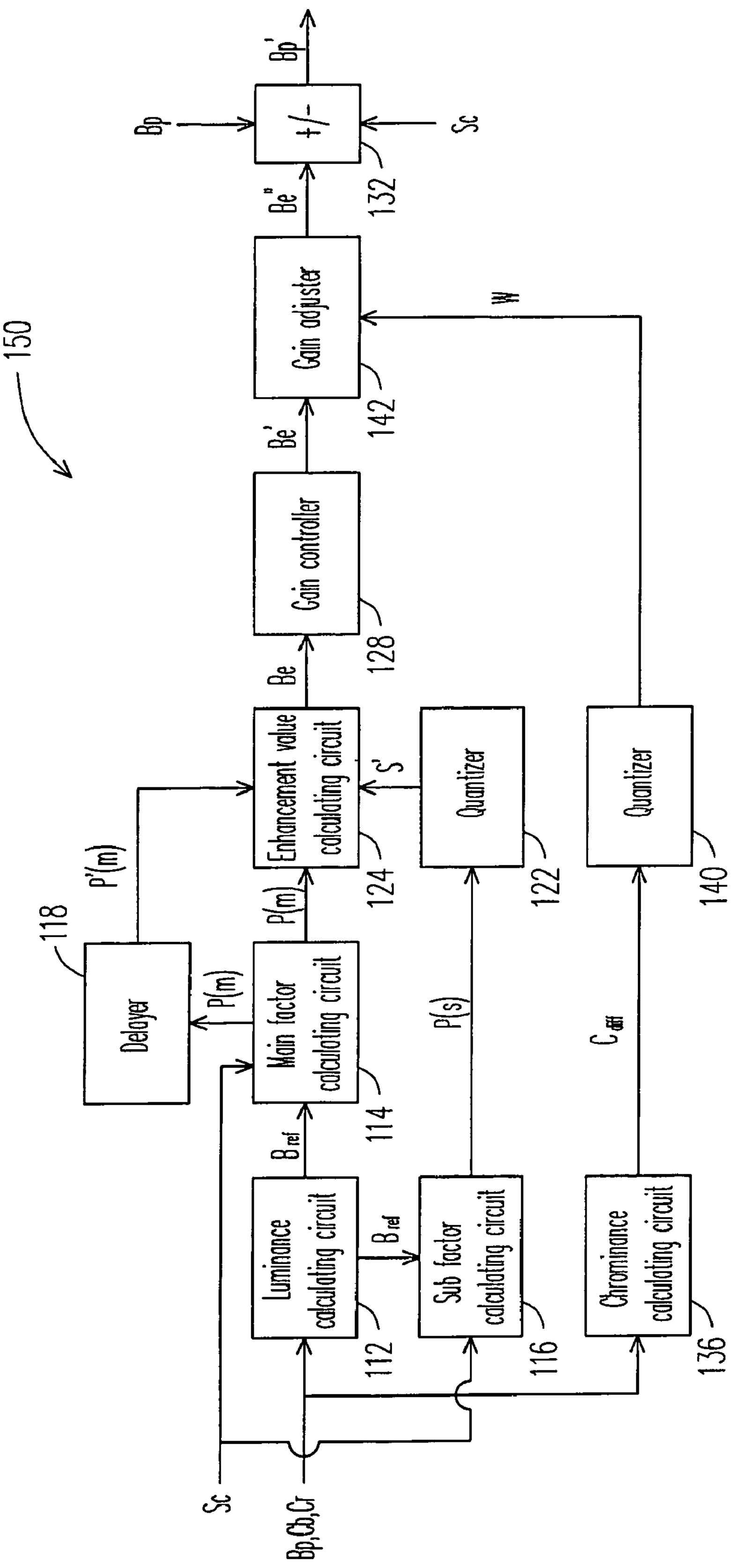
FIG. 16 is a functional block diagram of an image processing circuit designed according to another embodiment of the present invention.
Figure 17:
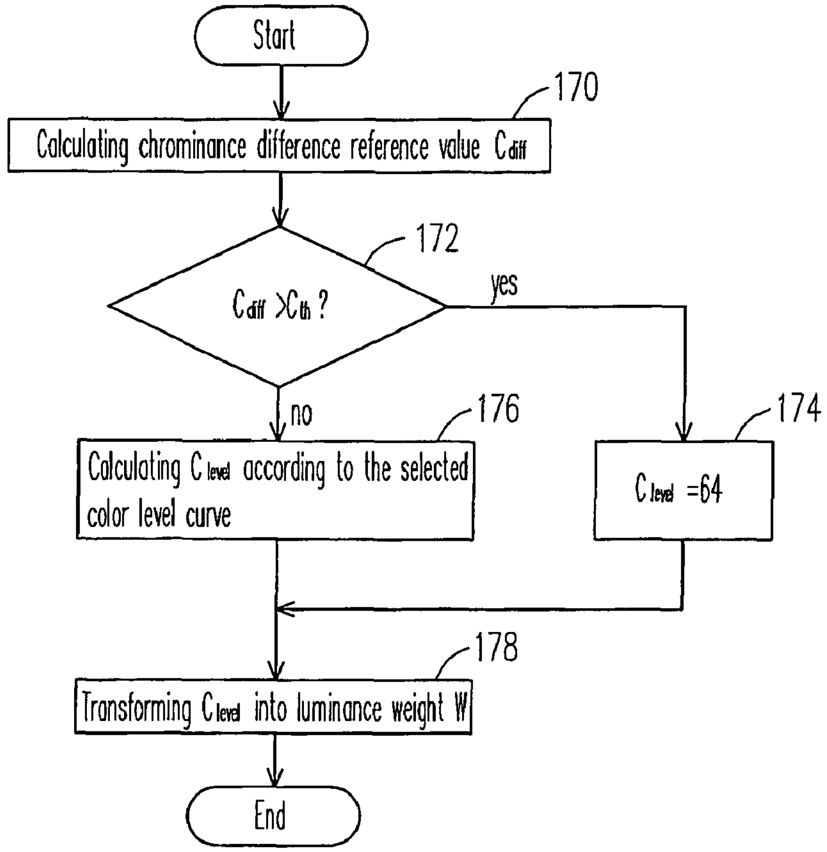
FIG. 17 is a flowchart illustrating a method of calculating a luminance weight.
Figure 18:
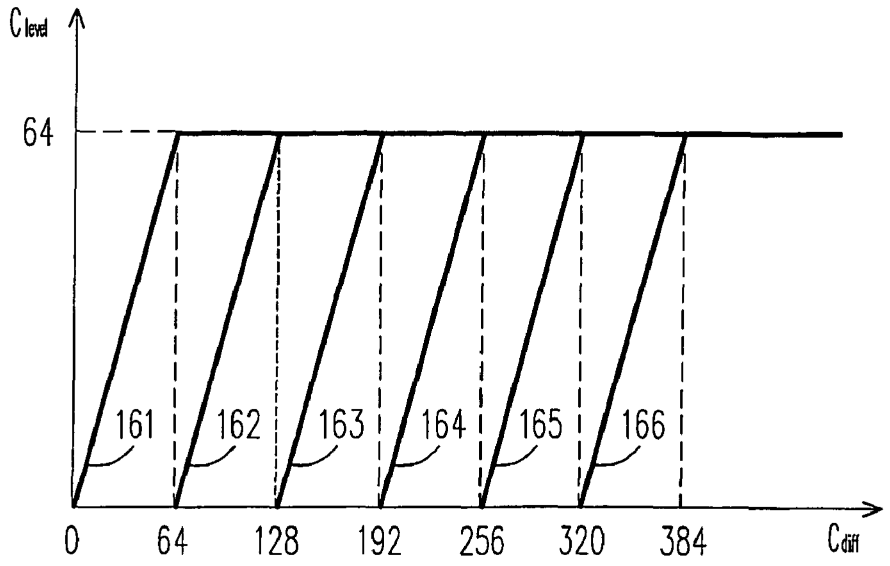
FIG. 18 is a diagram illustrating a relation between chrominance difference reference values and color levels.
Figure 19:
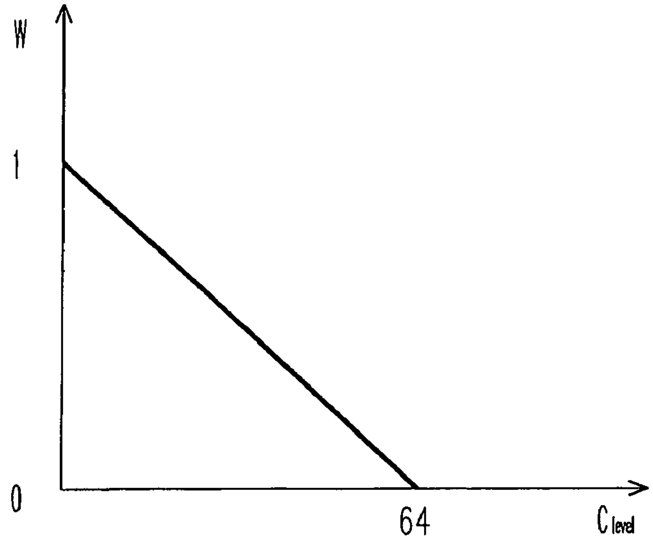
FIG. 19 is a diagram illustrating a relation between color levels and luminance weights.

In another embodiment of the present invention, a chrominance quantified value W is calculated according to the first chrominance value Cb and the second chrominance value Cr, and the luminance enhancement value Be' is adjusted according to the calculated chrominance quantified value W for substituting the aforementioned method of controlling the filter 130 via the control signal Sc. Referring to FIG. 16, which is a functional block diagram an image processing circuit 150 according to another embodiment of the present invention. Structure of the image processing circuit 150 is similar to that of the image processing circuit 110 shown in FIG. 15, and a difference there between is that the chrominance calculating circuit 126 and the filter 130 of the image processing circuit 110 are substituted by a chrominance calculating circuit 136, a quantizer 140 and a gain adjuster 142 of the image processing circuit 150. Functions and interconnections of other components of the image processing circuit 150 are identical with those of the image processing circuit 110 such that detailed description thereof will not be repeated. In the image processing circuit 150, the chrominance calculating circuit 136 calculates the chrominance difference reference value $C_{diff}$, and the chrominance difference reference value $C_{diff}$ is transformed into a luminance weight W via the quantizer 140. Next, the gain adjuster 142 multiplies the luminance enhancement value Be' with the luminance weight W and outputs the luminance enhancement value Be", i.e. the luminance enhancement value Be" is equal to (Be'×W). Referring to FIG. 17, which is a flow chart showing a method of transforming the chrominance difference reference value $C_{diff}$ into the luminance weight W. Firstly, in step 170, the chrominance calculating circuit 136 calculates the chrominance difference reference value $C_{diff}$. Next, in step 172, the quantizer 140 determines whether the chrominance difference reference value $C_{diff}$ is greater than the difference threshold value $C_{th}$ according to one of a plurality of color level curves 161-166 shown in FIG. 18. Wherein the chrominance difference reference value $C_{diff}$ would be varied based on the selection of the color level curves. For example, if the selected curve is the color level curve 161, the difference threshold value $C_{th}$ is equal to 64; if the selected curve is the color level curve 162, the difference threshold value $C_{th}$ is equal to 128. Corresponding difference threshold values $C_{th}$ could be obtained according to the selected color level curve. In the present embodiment, the color level curve 162 is selected for description, and the difference threshold values $C_{th}$ thereof is 128. When the quantizer 140 determines that the chrominance difference reference value $C_{diff}$ is greater than the difference threshold value 128, step 174 is executed, by which a color level $C_{level}$ is set to be a maximum value. e.g. 64. When the quantizer 140 determines that the chrominance difference reference value $C_{diff}$ is less than or equal to the difference threshold value 128, step 176 is executed, by which the chrominance difference reference value $C_{diff}$ is transformed into the corresponding color level $C_{level}$ according to the color level curve 162. For example, when the chrominance difference reference value $C_{diff}$ is less than 64, the corresponding color level $C_{level}$ is equal to zero; and when $64 \leqq C_{diff} \leqq 128$, the color level $C_{level}$ is equal to ($C_{diff}$−64). Next, the quantizer 140 transforms the color level $C_{level}$ into the luminance weight W according to a relation diagram shown in FIG. 19. As shown in FIG. 19, the relation of the color level $C_{level}$ and the luminance weight W is represented by a straight line with a slope of −1. Therefore, the greater the color level $C_{level}$ is, the smaller the corresponding luminance weight W is. For example, if the color level $C_{level}$ is equal to 0, the luminance weight W is equal to 1; if the color level $C_{level}$ is equal to 32, the luminance weight W is equal to 0.5; and if the color level $C_{level}$ is equal to 64, the luminance weight W is equal to 0. Referring to FIG. 16 again, after the luminance weight W is obtained according to the aforementioned method, the gain adjuster 142 multiplies the luminance enhancement value Be' with the luminance weight W and outputs the luminance enhancement value Be". Finally, the luminance enhancement circuit 132 adjusts the original luminance Bp according to the luminance enhancement value Be" and output the adjusted luminance value Bp'.

In another embodiment of the present invention, the image processing circuit 150 may be further simplified, and the luminance value of the target pixel may be adjusted only according to the main factor P(m), the sub factor P(s), the main factor P'(m) of the previous pixel and the chrominance difference reference value $C_{diff}$.

Figure 20:
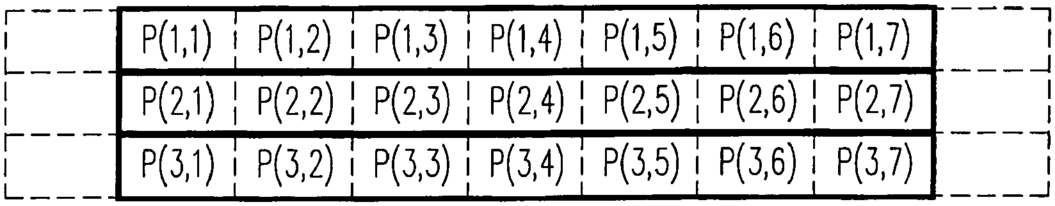
FIG. 20 is a diagram illustrating a two-dimensional processing method according to an embodiment of the present invention.

Moreover, though the plurality of pixels of one dimensional pixel row are taken as examples for the aforementioned embodiments of the present invention, the method of the present invention may also be implemented based on a two dimensional processing method. For example, in FIG. 20, 21 pixels P(1,1) to P(3,7) arranged in a 3×7 matrix are illustrated. Regarding a pixel P(2,4) located at the center, a luminance reference value $B_{ref}$(2,4) of the pixel P(2,4) is equal to (Bt'−20×Bp'), where Bt' is a summation of luminance values of the pixels P(1,1) to P(1,7), P(2,1) to P(2,3), P(2,5) to P(2,7) and P(3,1) to P(3,7), and Bp' is a luminance value of the pixel P(2,4). The main factor P(m) and the sub factor P(s) of the pixel may be respectively obtained according to the equations (3) and (4). Next, a luminance enhancement value Be(2,4) of the pixel P(2,4) is calculated according to the obtained main factor and the sub factor of the pixel P(2,4) and a main factor of the pixel P(2,3). Moreover, processing method of the chrominance thereof is similar to the processing method of the chrominance of the aforementioned one-dimensional pixels. For example, regarding a block composed by the pixels P(1,1) to P(3,7), a chrominance difference reference value $C'_{diff}$ thereof may be obtained according to the following equation:

$$C'_{diff} = \sum_{i=1}^{7} \sum_{j=1}^{3} [|(Cb(i, j) - C_{ref})| + |(Cr(i, j) - C_{ref})|] \quad (9)$$

where Cb(i,j) and Cr(i,j) are respectively a shifted first chrominance value Cb and a shifted second chrominance value Cr of a pixel P(i,j) within the block, and $C_{ref}$ is the chrominance reference value.

In summary, the luminance value of a pixel is adaptively adjusted according to the luminance values of the plurality of adjacent pixels. By analysing different luminance and chrominance information, different luminance enhancement values are assigned to different pixels so as to effectively reduce an unstable disturbance phenomenon of the image and to stabilize an output result of the image. Moreover, the pixels of the image are determined whether belong to a text portion, a picture area or a background portion of the image according to the luminance and chrominance information thereof, so as to enhance the displaying of the pixels in the text portion.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method for enhancing a text displaying, the image processing method comprising:

defining at least a first illumination area and at least a second illumination area in an image according to luminance values of a plurality of pixels of the image, wherein the first illumination area is located adjacent to the second illumination area;

calculating a luminance regulation value of at least one pixel in the first illumination area;

adjusting a luminance value of the corresponding pixel in the first illumination area according to the luminance regulation value; and restricting luminance values of all pixels in the second illumination area from any adjustment.

2. The image processing method as claimed in claim 1, wherein all of luminance values of pixels in the first illumination area are greater than or equal to a predetermined threshold value, and all of luminance values of the pixels in the second illumination area are less than the predetermined threshold value.

3. The image processing method as claimed in claim 1, wherein all of luminance values of pixels in the first illumination area are less than the predetermined threshold value, and all of luminance values of the pixels in the second illumination area are greater than or equal to the predetermined threshold value.

4. The image processing method as claimed in claim 1 further comprising:

calculating a luminance reference value of each of the pixels in the image, wherein for each of the pixels, the luminance reference value of the pixel is calculated according to a luminance value of the pixel and luminance values of a plurality of pixels located adjacent to the pixel;

wherein the first illumination area and the second illumination area are defined according to the luminance reference value of each of the pixels.

5. The image processing method as claimed in claim 4, wherein for each of the pixels, the luminance reference value of the pixel is equal to ($Bt - N_1 \times Bp$), wherein Bt is a summation of $N_1$ luminance values of pixels located adjacent to the pixel, Bp is a luminance value of the pixel, and $N_1$ is a positive integer.

6. The image processing method as claimed in claim 5, wherein step of calculating the luminance regulation value of at least one pixel in the first illumination area comprises:

calculating a factor pair of each pixel according to a luminance reference value of each pixel, wherein each of the factor pairs includes a main factor and a sub factor;

wherein for each of the pixels having luminance regulation values, the luminance regulation value thereof is calculated according to the factor pair of the pixel and factor pairs of pixels located adjacent to the pixel.

7. The image processing method as claimed in claim 6, wherein for each of the pixels, when the luminance reference value of the pixel is greater than zero, the main factor of the pixel is equal to the luminance reference value of the pixel, and the sub factor of the pixel is equal to zero.

8. The image processing method as claimed in claim 6, wherein for each of the pixels, when the luminance reference value of the pixel is less than or equal to zero, the main factor of the pixel is equal to zero, and the sub factor of the pixel is equal to a negative value of the luminance reference value of the pixel.

9. The image processing method as claimed in claim 1 further comprising:

calculating chrominance difference reference values of a plurality of blocks in the image, wherein each of the blocks has a plurality of adjacent pixels, and the chrominance difference reference value of each of the blocks is calculated according to chrominances of all pixels in the block and a chrominance reference value, wherein the luminance regulation value of each of the pixels is calculated according to the chrominance difference reference value of the block containing the pixel.

10. The image processing method as claimed in claim 9, wherein chrominance of each of the pixels is represented by a first chrominance value Cb and a second chrominance value Cr, and for each of the blocks, the chrominance difference reference value of the block is equal to $$\sum_{i=1}^{N_2} [|(Cb(i) - C_{ref})| + |(Cr(i) - C_{ref})|],$$

wherein Cb(i) and Cr(i) are respectively the first chrominance value Cb and the second chrominance value Cr of an i-th pixel in the block, $C_{ref}$ is the chrominance reference value, and $N_2$ represents a total number of pixels in the block.

11. The image processing method as claimed in claim 10 further comprising:

transforming a chrominance difference reference value of each of the pixels into a color level according to a threshold value range;

transforming the color level of each of the pixels into a luminance weight; and calculating the luminance regulation value of a corresponding pixel according to the luminance weight.

12. The image processing method as claimed in claim 1 further comprising:

determining whether there is any picture area in the image according to chrominances of the plurality of pixels; and if there is any picture area in the image, determining whether the first illumination area is overlapped with any of the picture area; and if the first illumination area is overlapped with any picture area, restricting luminance values of pixels in an overlapped area of the first illumination area and the picture area from any adjustment.

13. The image processing method as claimed in claim 12, wherein step of determining whether there is any picture area in the image comprises:

calculating chrominance difference reference values of a plurality of blocks in the image, wherein each of the blocks has a plurality of adjacent pixels, and the chrominance difference reference value of each of the blocks is calculated according to the chrominances of all pixels in the block and a chrominance reference value; and determining whether the chrominance difference reference value of each of the blocks is greater than a difference threshold value, wherein the block is a picture area if the chrominance difference reference value of the block is greater than the difference threshold value.

14. The image processing method as claimed in claim 13, wherein the chrominance of each of the pixels is represented by a first chrominance value Cb and a second chrominance value Cr, and for each of the blocks, the chrominance difference reference value of the block is $$\sum_{i=1}^{N_2} [|(Cb(i) - C_{ref})| + |(Cr(i) - C_{ref})|],$$

wherein Cb(i) and Cr(i) are respectively the first chrominance value Cb and the second chrominance value Cr of an i-th pixel in the block, $C_{ref}$ is the chrominance reference value, and $N_2$ represents a total number of pixels in the block.

15. The image processing method as claimed in claim 13, wherein the chrominance reference value is selected from a plurality of chrominance setting values.

16. An image processing circuit for enhancing text displaying of an image, the image processing circuit comprising:

a luminance calculating circuit, for calculating and outputting a luminance reference value of a target pixel according to a luminance value of the target pixel and luminance values of a plurality of pixels located adjacent to the target pixel;

a main factor calculating circuit, coupled to an output terminal of the luminance calculating circuit, for outputting a main factor according to the luminance reference value;

a sub factor calculating circuit, coupled to the output terminal of the luminance calculating circuit, for outputting a sub factor according to the luminance reference value; and a delayer, coupled to the main factor calculating circuit for delaying an output of the main factor calculating circuit, so as to output a main factor of a previous pixel of the target pixel;

wherein the image processing circuit adjusts the luminance value of the target pixel according to the main factor, the sub factor and the main factor of the previous pixel.

17. The image processing circuit as claimed in claim 16, wherein the luminance reference value of the target pixel is equal to $(Bt-N_1\times Bp)$, wherein Bt is a summation of $N_1$ luminance values of pixels located adjacent to the target pixel, Bp is the luminance value of the target pixel, and $N_1$ is a positive integer.

18. The image processing circuit as claimed in claim 16 further comprising:

a chrominance calculating circuit, for determining whether the target pixel belongs to a picture area according to chrominance information of the target pixel, and determining a voltage level of a control signal;

wherein the image processing circuit further determines whether to adjust the luminance value of the target pixel according to the control signal.

19. The image processing circuit as claimed in claim 16 further comprising:

a chrominance calculating circuit, for calculating a chrominance difference reference value according to the chrominance information of the pixel and chrominance information of the pixels located adjacent to the target pixel;

wherein the image processing circuit further adjusts the luminance value of the target pixel according to the chrominance difference reference value.

20. The image processing circuit as claimed in claim 17, wherein the target pixel and the pixels located adjacent to the target pixel compose a block, and chrominance information of each of the pixels in the block is represented by a first chrominance value Cb and a second chrominance value Cr, and for each of the blocks, the chrominance difference reference value of the block is equal to $$\sum_{i=1}^{N_2} [|(Cb(i) - C_{ref})| + |(Cr(i) - C_{ref})|],$$

wherein Cb(i) and Cr(i) are respectively the first chrominance value Cb and the second chrominance value Cr of an i-th pixel in the block, $C_{ref}$ is the chrominance reference value, and $N_2$ represents a total number of pixels in the block.

* * * * *